(12) United States Patent
Sbar et al.

(10) Patent No.: US 11,890,835 B2
(45) Date of Patent: Feb. 6, 2024

(54) LAMINATION OF ELECTROCHROMIC DEVICE TO GLASS SUBSTRATES

(71) Applicant: SAGE ELECTROCHROMICS, INC., Faribault, MN (US)

(72) Inventors: Neil L. Sbar, Northfield, MN (US); John E. Van Dine, Mahwah, MN (US); Michael A. McCoy, Eden Prairie, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 64 days.

(21) Appl. No.: 17/557,627

(22) Filed: Dec. 21, 2021

(65) Prior Publication Data

US 2022/0111619 A1    Apr. 14, 2022

Related U.S. Application Data

(63) Continuation of application No. 15/065,050, filed on Mar. 9, 2016, now Pat. No. 11,241,865, which is a
(Continued)

(51) Int. Cl.
*G02F 1/153*    (2006.01)
*B32B 17/10*    (2006.01)
(Continued)

(52) U.S. Cl.
CPC .. *B32B 17/10513* (2013.01); *B32B 17/10045* (2013.01); *B32B 17/10174* (2013.01); *B32B 17/10743* (2013.01); *B32B 17/10761* (2013.01); *B32B 17/10981* (2013.01); *B32B 38/0004* (2013.01); *C03B 33/076* (2013.01); *G02F 1/133351* (2013.01); *G02F 1/153* (2013.01); *G02F 1/1533* (2013.01);
(Continued)

(58) Field of Classification Search
CPC ........ B32B 17/10513; B32B 17/10045; B32B 17/10174; B32B 17/10743; B32B 17/10761; B32B 17/10981; B32B 38/0004; C03B 33/076; C03B 33/0222; C03B 33/027; C03B 33/091; G02F 1/133351; G02F 1/153; G02F 1/1533; G02F 1/15; G02F 1/1514; Y10T 156/1052; Y10T 156/1062; Y10T 156/1064; Y10T 156/1075; Y10T 156/1089
USPC .................................. 359/265–275
See application file for complete search history.

(56) References Cited

U.S. PATENT DOCUMENTS 3,865,294 A    2/1975    Ernsberger et al.
4,419,386 A    12/1983    Gordon
(Continued)

FOREIGN PATENT DOCUMENTS

CN    1510494 A    7/2004
DE    102006042538 A1    3/2008
(Continued)

OTHER PUBLICATIONS

Chinese Office Action for Application No. 201180044447.3, dated Jul. 2, 2014, 19 pages.
(Continued)

*Primary Examiner* — Tuyen Tra
(74) *Attorney, Agent, or Firm* — Abel Schillinger, LLP; Robert N Young

(57) ABSTRACT

Electrochromic device laminates and their method of manufacture are disclosed.

19 Claims, 8 Drawing Sheets

Related U.S. Application Data continuation of application No. 13/906,456, filed on May 31, 2013, now Pat. No. 9,316,883, which is a continuation of application No. 13/178,065, filed on Jul. 7, 2011, now Pat. No. 8,482,838, which is a continuation of application No. 13/040,787, filed on Mar. 4, 2011, now Pat. No. 8,482,837.

(60) Provisional application No. 61/412,153, filed on Nov. 10, 2010, provisional application No. 61/311,001, filed on Mar. 5, 2010.

(51) Int. Cl.
| | |
|---|---|
| *C03B 33/07* | (2006.01) |
| *B32B 38/00* | (2006.01) |
| *G02F 1/1333* | (2006.01) |
| *C03B 33/09* | (2006.01) |
| *C03B 33/027* | (2006.01) |
| *C03B 33/02* | (2006.01) |
| *G02F 1/15* | (2019.01) |

(52) U.S. Cl.
CPC ........ *C03B 33/027* (2013.01); *C03B 33/0222* (2013.01); *C03B 33/091* (2013.01); *G02F 1/15* (2013.01); *Y10T 156/1052* (2015.01); *Y10T 156/1062* (2015.01); *Y10T 156/1064* (2015.01); *Y10T 156/1075* (2015.01); *Y10T 156/1089* (2015.01)

(56) References Cited

U.S. PATENT DOCUMENTS

| | | | |
|---|---|---|---|
| 4,844,591 | A | 7/1989 | Arribart et al. |
| 5,124,832 | A | 6/1992 | Greenberg et al. |
| 5,154,334 | A | 10/1992 | Dekker |
| 5,229,040 | A | 7/1993 | Desbat et al. |
| 5,239,406 | A | 8/1993 | Lynam |
| 5,244,557 | A | 9/1993 | Defendini et al. |
| 5,248,545 | A | 9/1993 | Proscia |
| 5,283,310 | A | 2/1994 | Armand et al. |
| 5,321,544 | A | 6/1994 | Parkhe et al. |
| 5,370,775 | A | 12/1994 | Parkhe |
| 5,404,244 | A | 4/1995 | Van Dine et al. |
| 5,501,919 | A | 3/1996 | Paul et al. |
| 5,507,965 | A | 4/1996 | Padoy et al. |
| 5,530,581 | A | 6/1996 | Cogan |
| 5,657,149 | A | 8/1997 | Buffat et al. |
| 5,659,417 | A | 8/1997 | Van Dine et al. |
| 5,668,663 | A | 9/1997 | Varaprasad et al. |
| 5,724,175 | A | 3/1998 | Hichwa et al. |
| 5,724,177 | A | 3/1998 | Ellis, Jr. et al. |
| 5,755,537 | A | 5/1998 | Lubbering |
| 5,757,537 | A | 5/1998 | Ellis, Jr. et al. |
| 5,825,526 | A | 10/1998 | Bommarito et al. |
| 5,889,608 | A | 3/1999 | Buffat et al. |
| 5,985,486 | A | 11/1999 | Giron |
| 6,055,088 | A | 4/2000 | Fix et al. |
| 6,154,306 | A | 11/2000 | Varaprasad et al. |
| 6,186,384 | B1 | 2/2001 | Sawada |
| 6,195,193 | B1 | 2/2001 | Anderson et al. |
| 6,204,953 | B1 | 3/2001 | Zieba et al. |
| 6,252,197 | B1 | 6/2001 | Hoekstra et al. |
| 6,256,152 | B1 | 7/2001 | Coldrey et al. |
| 6,259,549 | B1 | 7/2001 | Leupolz et al. |
| 6,355,125 | B1 | 3/2002 | Tahon et al. |
| 6,407,360 | B1 | 6/2002 | Choo et al. |
| 6,502,423 | B1 | 1/2003 | Ostendarp et al. |
| 6,587,250 | B2 | 7/2003 | Armgarth et al. |
| 6,639,708 | B2 | 10/2003 | Elkadi et al. |
| 6,723,952 | B2 | 4/2004 | Choo et al. |
| 6,785,036 | B1 | 8/2004 | Berneth et al. |
| 7,015,118 | B2 | 3/2006 | Wakayama et al. |
| 7,033,655 | B2 | 4/2006 | Beteille et al. |
| 7,074,486 | B2 | 7/2006 | Boire et al. |
| 7,110,157 | B2 | 9/2006 | Beteille et al. |
| 7,230,748 | B2 | 6/2007 | Giron et al. |
| 7,245,414 | B2 | 7/2007 | Liang et al. |
| 7,273,403 | B2 | 9/2007 | Yokota et al. |
| 7,372,610 | B2 | 5/2008 | Burdis et al. |
| 7,593,154 | B2 | 9/2009 | Burdis et al. |
| 7,710,671 | B1 | 5/2010 | Kwak et al. |
| 7,738,155 | B2 | 6/2010 | Agrawal et al. |
| 7,835,059 | B2 | 11/2010 | Giri et al. |
| 7,855,821 | B2 | 12/2010 | Baumann et al. |
| 7,884,994 | B2 | 2/2011 | Piroux |
| 8,102,585 | B2 | 1/2012 | Giron et al. |
| 8,218,224 | B2 | 7/2012 | Kwak et al. |
| 8,482,837 | B2 | 7/2013 | Sbar et al. |
| 8,482,838 | B2 | 7/2013 | Sbar et al. |
| 8,506,096 | B2 | 8/2013 | McCabe et al. |
| 9,182,644 | B2 | 11/2015 | Sbar et al. |
| 9,316,883 | B2 | 4/2016 | Sbar et al. |
| 2002/0054419 | A1 | 5/2002 | Beteille et al. |
| 2002/0118437 | A1 | 8/2002 | Rukavina et al. |
| 2002/0126365 | A1 | 9/2002 | Armgarth et al. |
| 2003/0209528 | A1 | 11/2003 | Choo et al. |
| 2003/0227663 | A1 | 12/2003 | Agrawal et al. |
| 2004/0067343 | A1 | 4/2004 | Beteille et al. |
| 2004/0086688 | A1 | 5/2004 | Hirano et al. |
| 2005/0002081 | A1 | 1/2005 | Beteille et al. |
| 2005/0025980 | A1 | 2/2005 | Agrawal et al. |
| 2006/0065647 | A1 | 3/2006 | Kim et al. |
| 2006/0101858 | A1 | 5/2006 | Fujii |
| 2006/0187608 | A1 | 8/2006 | Stark |
| 2006/0191970 | A1 | 8/2006 | Kataoka et al. |
| 2007/0002422 | A1 | 1/2007 | O'Shaughnessy |
| 2007/0090100 | A1 | 4/2007 | Yonai et al. |
| 2007/0151962 | A1 | 7/2007 | Doll et al. |
| 2009/0027759 | A1 | 1/2009 | Albahri |
| 2009/0194514 | A1 | 8/2009 | Yue |
| 2009/0262411 | A1 | 10/2009 | Karmhag et al. |
| 2009/0297806 | A1 | 12/2009 | Dawson-Elli et al. |
| 2009/0316081 | A1 | 12/2009 | Nishida et al. |
| 2009/0316248 | A1 | 12/2009 | Karmhag et al. |
| 2010/0078417 | A1 | 4/2010 | Abramov et al. |
| 2010/0134865 | A1 | 6/2010 | Higuchi et al. |
| 2010/0208326 | A1 | 8/2010 | Kwak et al. |
| 2010/0210442 | A1 | 8/2010 | Abramov et al. |
| 2010/0279067 | A1 | 11/2010 | Sabia et al. |
| 2011/0049765 | A1 | 3/2011 | Li et al. |
| 2011/0261429 | A1 | 10/2011 | Sbar et al. |
| 2011/0267672 | A1 | 11/2011 | Sbar et al. |
| 2011/0297806 | A1 | 12/2011 | Hoo et al. |
| 2011/0304899 | A1 | 12/2011 | Kwak et al. |
| 2012/0047956 | A1 | 3/2012 | Li |
| 2013/0258437 | A1 | 10/2013 | Sbar et al. |
| 2013/0258438 | A1 | 10/2013 | Sbar et al. |
| 2013/0266757 | A1 | 10/2013 | Giron et al. |
| 2013/0312341 | A1 | 11/2013 | Gy et al. |
| 2014/0370257 | A1 | 12/2014 | Dawson-Elli et al. |
| 2016/0187753 | A1 | 6/2016 | Sbar et al. |

FOREIGN PATENT DOCUMENTS

| | | |
|---|---|---|
| EP | 0253713 A1 | 1/1988 |
| EP | 0382623 A1 | 8/1990 |
| EP | 0408427 A1 | 1/1991 |
| EP | 0518754 A1 | 12/1992 |
| EP | 0521602 A1 | 1/1993 |
| EP | 0532408 A1 | 3/1993 |
| EP | 0575207 A1 | 12/1993 |
| EP | 0612826 A1 | 8/1994 |
| EP | 0670346 A1 | 9/1995 |
| EP | 0825478 A1 | 2/1998 |
| EP | 0831360 A1 | 3/1998 |
| EP | 1253461 A2 | 10/2002 |
| EP | 1434083 A2 | 6/2004 |
| EP | 2542407 B1 | 12/2013 |
| EP | 2641734 | 2/2017 |
| EP | 3216597 A1 | 9/2017 |
| FR | 2781062 A1 | 1/2000 |
| FR | 2829723 A1 | 3/2003 |

(56) References Cited

FOREIGN PATENT DOCUMENTS

| | | |
|---|---|---|
| JP | S49010208 A | 1/1974 |
| JP | 57-158623 A | 9/1982 |
| JP | S5891726 U | 6/1983 |
| JP | 59-195629 A | 11/1984 |
| JP | H03164451 A | 7/1991 |
| JP | H06300992 A | 10/1994 |
| JP | 07-318877 A | 12/1995 |
| JP | H08313940 A | 11/1996 |
| JP | 2000061677 A | 2/2000 |
| JP | 2000290031 A | 10/2000 |
| JP | 2002289899 A | 10/2002 |
| JP | 2003197103 A | 7/2003 |
| JP | 2003308792 A | 10/2003 |
| JP | 2004148438 A | 5/2004 |
| JP | 2005037709 A | 2/2005 |
| JP | 2005527858 A | 9/2005 |
| JP | 2005314127 A | 11/2005 |
| JP | 2009023215 A | 2/2009 |
| JP | 2009-294461 A | 12/2009 |
| JP | 2010506209 A | 2/2010 |
| JP | 2010108684 A | 5/2010 |
| JP | 2010-194550 A | 9/2010 |
| JP | 2011524269 A | 9/2011 |
| JP | 2012511498 A | 5/2012 |
| JP | 2013503361 A | 1/2013 |
| WO | 0003290 A1 | 1/2000 |
| WO | 02-06889 A1 | 1/2002 |
| WO | 02/07967 A1 | 1/2002 |
| WO | 03098339 A2 | 11/2003 |
| WO | 2005007398 A2 | 1/2005 |
| WO | 2008045240 A2 | 4/2008 |
| WO | 2009-128334 A1 | 10/2009 |
| WO | 2010068525 A2 | 6/2010 |
| WO | 2010126977 A1 | 11/2010 |
| WO | 2011028254 A2 | 3/2011 |
| WO | 2011109688 A1 | 9/2011 |
| WO | 2012007335 A1 | 1/2012 |

OTHER PUBLICATIONS

Wei, Hongli et al., "New Progress of Study on Inorganic Electrochromic Glass," Glass, No. 1, Feb. 28, 2006, pp. 34-37 (English Summary Provided).

International Search Report and Written Opinion for Application No. PCT/EP2011/061408, dated Oct. 10, 2011, 11 pages.

International Search Report and Written Opinion for Application No. PCT/EP2011/061407, dated Sep. 27, 2011, 11 pages.

International Search Report and Written Opinion for Application No. PCT/EP2011/060363, dated Sep. 22, 2011, 9 pages.

International Search Report and Written Opinion for Application No. PCT/US2013/029871, dated Jun. 26, 2013, 8 pages.

Non-Final Office Action for U.S. Appl. No. 13/790,126, dated Jul. 24, 2014, 35 pages.

Final Office Action for U.S. Appl. No. 13/790,126, dated Jan. 27, 2015, 19 pages.

Beason, W. Lynn et al., "A Thermal Stress Evaluation Procedure for Monolithic Annealed Glass," Symp on the Use of Glass in Buildings, ASTM STP 1434, V. Block Ed., dated 2002, pp. 105-118.

Veer F.A. et al., "The Strength of Annealed, Heat-Strengthened and Fully Tempered Float Glass," Fatigue & Fracture of Engineering Materials & Structures, vol. 32, dated 2009, pp. 18-25.

International Search Report and Written Opinion, PCT/US11/27148, dated Jun. 7, 2011.

European Office Action for Application No. 13173248.9, dated Apr. 17, 2014.

Japanese Office Action for Application No. 2012-556257, dated Jul. 24, 2014.

Extended European Search Report for Application No. EP13173248, dated Jul. 25, 2013.

Vuolio, Aki, "Structural Behaviour of Glass Structures in Facades," Helsinki University of Technology Laboratory of Steel Structures Publications 27, Thesis for the Degree of Licentiate of Science in Technology, dated 2003, 163 pages.

Non-Final Office Action for U.S. Appl. No. 13/790,126, dated May 14, 2015, 19 pages.

Notice of Allowance for U.S. Appl. No. 13/790,126, dated Oct. 27, 2015, 28 pages.

Chinese Office Action for Application No. CN 201180013326.2, dated Mar. 31, 2014.

A.B. Zhimalov et al.: "Signs for glass production—laser cutting of float glass during production", published in Glass & Ceramics, p. 319-321, vol. 63, Nos. 9-10, 2006.

V.S. Kondratenko et al.: "Laser strengthening of the edge of glass", published in J. Opt. Technol. 76 (II), p. 733-736, Nov. 2009.

A.A. Abramov et al.: Laser separation of chemically strengthened glass, published in Physics Procedia 5 (2010), p. 285-290 (relevant at least according to article 54(3) EPC).

L.A. Shitova et al.: "Quality requires constant attention—Glass edge quality and strength", published in Steklo i Keramika, No. 8, pp. 2-3, Aug. 1991.

Presentation "Jenoptik-Votan Solas Series for the Photovoltaic Market", held on Dec. 29, 2009, in particularly slides 35-38.

Charles R. Kurkjian: "Strength of Inorganic Glass", proceedings of a NATO Advanced Research Workshop entitled Strength of Glass, held on Mar. 21-25, 1983, published in 1985.

Michael Degel, Jenoptik Automatisierungstechnik GmbH: "Latest state-of-the-art laser cutting development", published in the proceedings of "Glass Performance Days" in Tampere, Finland, Jun. 15-18, 2007.

Domone et al., "Construction Materials—Their Nature and Behavior," Dec. 2001, Taylor and Francis, 4th Edition, pp. 509-518.

Veer, F.A., "The strength of glass, a a nontransparent value," Heron, vol. 52, No. 1/2, pp. 87-104, 2007.

Hermanns, Christoph, "Laser cutting of glass," SPIE (International Symposium on Optical Science and Technology), Proceeding vol. 4102, Oct. 25, 2000, pp. 219-226.

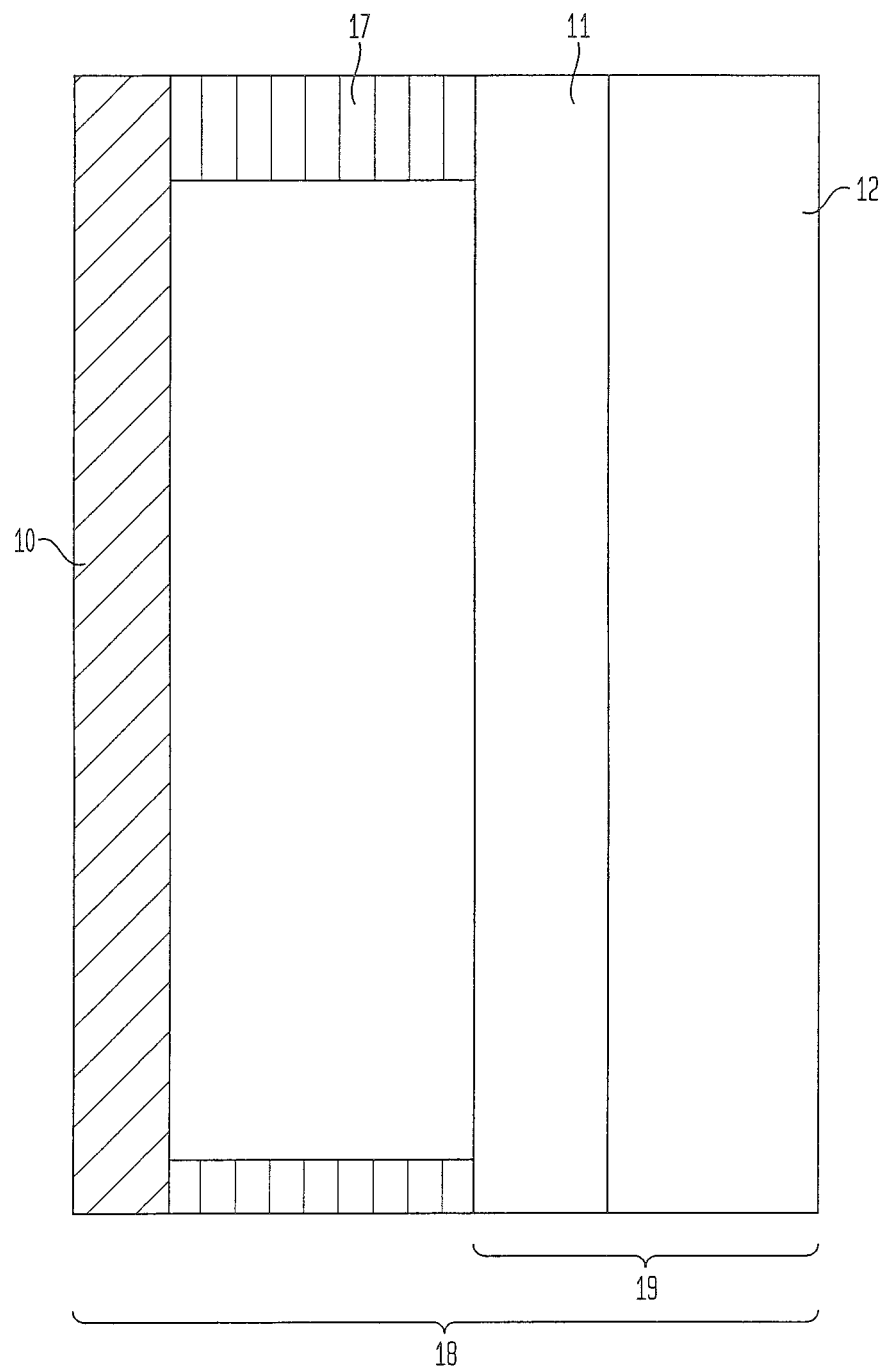

LAMINATION OF ELECTROCHROMIC DEVICE TO GLASS SUBSTRATES

CROSS-REFERENCE TO RELATED APPLICATIONS

This application is a continuation of and claims priority under 35 U.S.C. § 120 to U.S. patent application Ser. No. 15/065,050, entitled "LAMINATION OF ELECTROCHROMIC DEVICE TO GLASS SUBSTRATES," by Neil L. Sbar et al., filed Mar. 9, 2016, which is a continuation of and claims priority under 35 U.S.C. § 120 to U.S. patent application Ser. No. 13/906,456, entitled "LAMINATION OF ELECTROCHROMIC DEVICE TO GLASS SUBSTRATES," by Neil L. Sbar et al., filed May 31, 2013, now U.S. Pat. No. 9,316,883, which is a continuation of U.S. patent application Ser. No. 13/178,065, entitled "LAMINATION OF ELECTROCHROMIC DEVICE TO GLASS SUBSTRATES," by Neil L. Sbar et al., filed Jul. 7, 2011, now U.S. Pat. No. 8,482,838, which is a continuation of U.S. patent application Ser. No. 13/040,787, entitled "LAMINATION OF ELECTROCHROMIC DEVICE TO GLASS SUBSTRATES," by Neil L. Sbar et al., filed Mar. 4, 2011, now U.S. Pat. No. 8,482,837, which claims priority under 35 U.S.C. § 119(e) to U.S. Provisional Patent Application No. 61/412,153, entitled "LAMINATION OF ELECTROCHROMIC DEVICE TO GLASS SUBSTRATES," by Neil L. Sbar et al., filed Nov. 10, 2010, and U.S. Provisional Patent Application No. 61/311,001, entitled "LAMINATION OF ELECTROCHROMIC DEVICE TO GLASS SUBSTRATES," by Neil L. Sbar et al., filed Mar. 5, 2010, all of which applications are assigned to the current assignee hereof and incorporated herein by reference in their entireties.

BACKGROUND OF THE INVENTION

Glass, especially glass that is tinted, is subjected to large stresses due to non-uniform heating caused by the absorption of solar radiation. These stresses can be so great as to cause fractures or cracks to develop in the glass, which could ultimately lead to failure.

The center of the glass (COG) may have a considerably higher temperature than, for example, the edges of the glass, which are typically covered or shadowed by a frame or other architectural structure. Of course, the more tinted the glass, the greater the solar absorption, and the larger the potential temperature differential between the COG and the glass edges or other shaded areas. This results in stress, typically along the glass edges, which if greater than about 14 to about 28 MPa, could result in cracking. As such, normal practice dictates that glass be heat-strengthened or tempered to reduce the incidence of fracture. Typically, the absorbing glass pane is heat-treated or tempered so as to withstand at least about 35 MPa, or to conform with industry standards, such as ASTM E2431 (Practice for Determining the Resistance of Single Glazed Annealed Architectural Flat Glass to Thermal Loadings). Of course, this adds to the cost of manufacturing.

Like tinted glasses, electrochromic devices (hereinafter "EC devices") absorb significant amounts of solar radiation, especially when in a fully darkened state. To withstand the stresses or service loads associated with these temperature differentials, it is common practice to use heat-strengthened or tempered glass as the substrate for these devices. While this is a practical solution, the cost of manufacturing devices based on these substrates is expensive. It is desirable to reduce costs and increase efficiency in the manufacture of EC devices, while maintaining their structural stability (i.e. their ability to withstand cracking and failure both during the manufacturing process and when installed in the field).

Traditional EC devices and the insulated glass units (IGUs) comprising them have the structure shown in FIG. 1A. As used herein, the term "insulated glass unit" means two or more layers of glass separated by a spacer along the edge and sealed to create a dead air space (or other gas, e.g. argon, nitrogen, krypton) between the layers. The IGU 18 comprises an interior glass panel 10 and an EC device 19. The EC device 19 is comprised of an EC stack 11 comprising a series of applied or deposited films on the EC substrate 12. The EC substrate 12 is traditionally comprised of glass which has been heat-strengthened or tempered.

To form the IGU 18, a glass panel, which will become the EC substrate 12, is first cut to a custom size according to the dimensions needed. The cut glass panel 12 is then tempered or heat-strengthened to provide sufficient strength to endure fabrication stresses and stresses encountered during its service life ("service loads"). The EC device stack 11, comprising, for example, a series of thin films, is then applied or deposited to the glass panel 12 by methods known in the art (see, for example, U.S. Pat. Nos. 7,372,610 and 7,593,154, the disclosures of which are incorporated by reference herein). Cutting of the glass panel 12 is not performed after tempering or heat strengthening. Likewise, the substrate of an EC device 19 is generally not tempered or heat-strengthened after the films forming the EC stack 11 are deposited (unless using a suitably post-temperable EC films stack and process). The IGU 18 is then assembled by combining the EC device 19 with another glass panel 10. The two panels are separated by spacers 17. Panel 10 may contain thin film coatings on either side (e.g. for solar control).

BRIEF DESCRIPTION OF THE DRAWINGS

FIG. 1a is a cut-away view of a traditional IGU comprising an EC device.

SUMMARY OF THE INVENTION

Figure 1B:
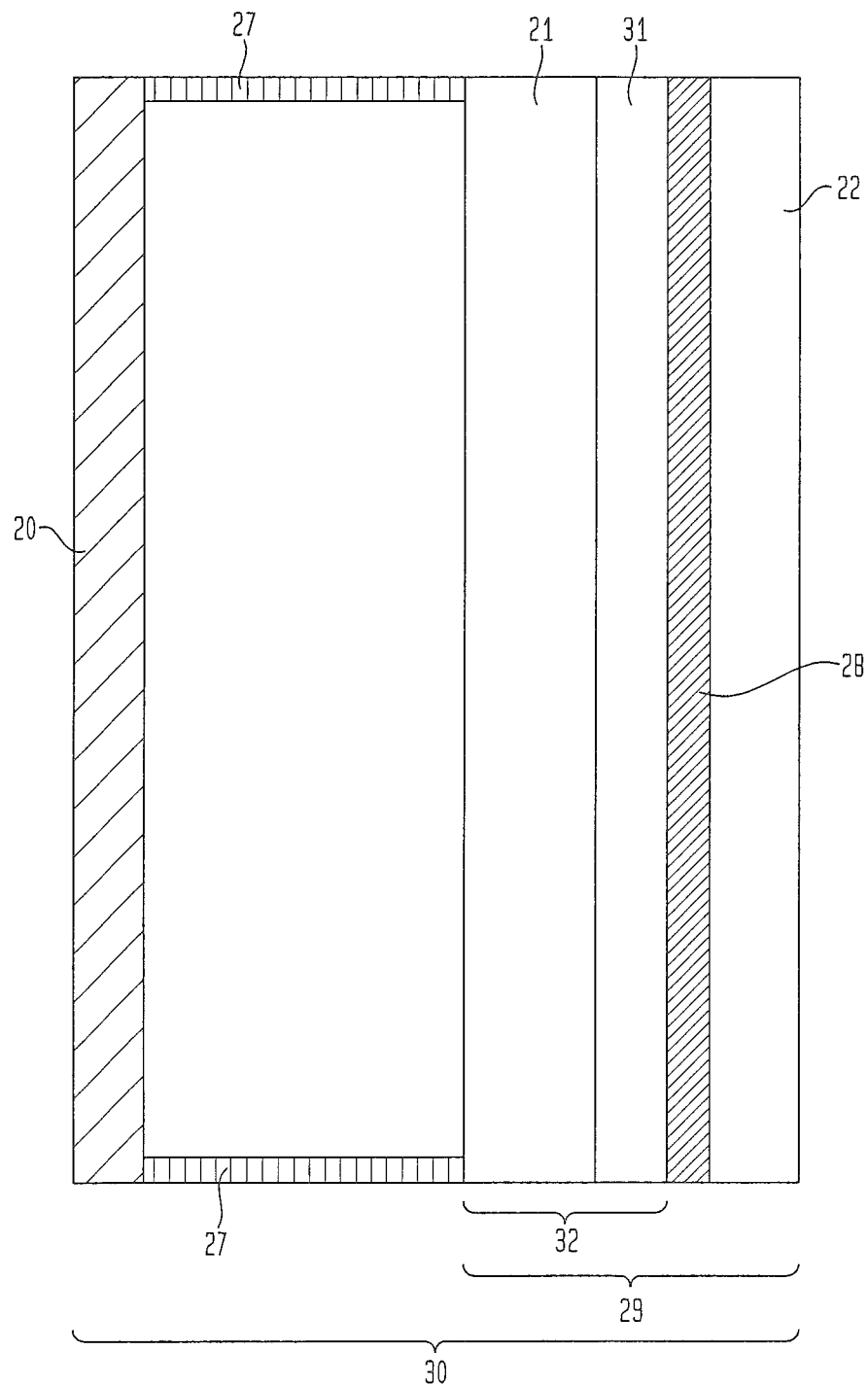
FIG. 1b is a cut-away view of an IGU comprising an EC device, where the EC device is itself a laminate of two materials.

Applicants have developed an improved IGU comprising an EC device laminate. Applicants have also developed a method of manufacturing the improved EC device laminate and IGU.

In one aspect of the present invention, Applicants have discovered a process of manufacturing an electrochromic device laminate comprising: (a) providing an electrochromic substrate; (b) cutting the electrochromic substrate into one or more substrate daughter panes; (c) fabricating a plurality of electrochromic device precursors on each of the one or more substrate daughter panes; (d) cutting each of the electrochromic device precursors into individual electrochromic devices; and (e) laminating each of the individual electrochromic devices to a separate outer laminate glass pane (an example of the "cut-then-coat-then-cut" process described further herein). In one embodiment, the electrochromic device precursors are mechanically cut. In another embodiment, the electrochromic device precursors are laser cut. In another embodiment the EC device is cut by electrothermal cutting.

In another embodiment, the individual electrochromic devices have an edge strength of at least about 60 MPa. In another embodiment, the individual electrochromic devices have an edge strength of at least about 69 MPa. In another embodiment, the individual electrochromic devices have an edge strength of at least about 75 MPa. In another embodiment, the individual EC devices have an edge strength of at least about 100 MPa.

In another embodiment, the individual electrochromic devices are about the same size as the outer laminate glass pane. In another embodiment, the individual electrochromic devices are smaller than the outer laminate glass pane in at least one dimension. In another embodiment, the individual electrochromic devices are indented about 0.5 mm to about 3 mm relative to the outer laminate glass pane in at least one dimension. In another embodiment, the individual electrochromic devices are indented about 1 mm to about 2.0 mm relative to the outer laminate glass pane in at least one dimension, preferably in all dimensions.

In another embodiment, the electrochromic substrate and the outer laminate glass pane comprise the same material. In another embodiment, the electrochromic substrate is a different material than the outer laminate glass pane. In another embodiment, a material for the electrochromic substrate is selected from the group consisting of low coefficient of thermal expansion glass, soda-lime float glass, aluminosilicate glass, borofloat glass, boroaluminosilicate glass, other low-sodium composition glasses or a polymer. In another embodiment, the electrochromic substrate has a coefficient of thermal expansion ranging from about 2 ppm/K to about 10 ppm/K for glass substrates and up to about 80 ppm/K for polymer substrate materials. In another embodiment, the electrochromic substrate has a coefficient of thermal expansion ranging from about 4 ppm/K to about 8 ppm/K. In another embodiment, the electrochromic substrate has a thickness ranging from about 0.7 mm to about 6 mm.

In another embodiment, a material for the outer laminate glass pane is selected from the group consisting of low coefficient of thermal expansion glass, soda-lime float glass, aluminosilicate glass, borofloat glass, boroaluminosilicate glass, heat-strengthened glass, tempered glass, or a polymer. In another embodiment, the outer laminate glass pane has a coefficient of thermal expansion ranging from about 2 ppm/K to about 10 ppm/K. For polymer-based substrates, the coefficient of thermal expansion can be up to about 80 ppm/K. In another embodiment, the outer laminate glass pane has a thickness ranging from about 2.3 mm to about 12 mm. In another embodiment, the interlayer material is selected from the group consisting of polyvinylbutyral, ionomeric polymers, ethylenevinyl acetate, polyurethanes, or mixtures thereof.

Another aspect of the present invention is a laminate prepared according to the "cut-then-coat-then-cut" process.

In another embodiment, the laminate prepared according to the "cut-then-coat-then-cut" process comprises a substrate having an edge strength of at least about 60 MPa.

In another aspect of the present invention, Applicants have discovered a process of manufacturing an electrochromic device laminate comprising: (a) providing an electrochromic substrate; (b) fabricating a plurality of electrochromic device precursors on the electrochromic substrate; (c) cutting each of the electrochromic device precursors into individual electrochromic devices; and (d) laminating each of the individual electrochromic devices to a separate outer laminate glass pane (an example of the "coat-then-cut" process described further herein). The EC device precursors may be cut mechanically by laser, or by electrothermal cutting.

In another embodiment, the individual electrochromic devices have an edge strength of at least about 60 MPa. In another embodiment, the edge strength is at least about 69 MPa. In another embodiment, the edge strength is at least about 75 MPa. In another embodiment, the edge strength is at least about 100 MPa.

In another embodiment, the individual electrochromic device is about the same size as the outer laminate glass pane. In another embodiment, the individual electrochromic device is smaller than the outer laminate glass pane in at least one dimension. In another embodiment, the individual electrochromic device is indented about 0.5 mm to about 3 mm relative to the outer laminate glass pane in at least one dimension. In another embodiment, the individual electrochromic device is indented about 1 mm to about 2.0 mm relative to the outer laminate glass pane in at least one dimension.

In another embodiment, the annealed glass substrate and the outer laminate glass pane comprise the same material. In another embodiment, the electrochromic substrate is a different material than the outer laminate glass pane. In another embodiment, a material for the electrochromic substrate is selected from the group consisting of low coefficient of thermal expansion glass, soda-lime float glass, aluminosilicate glass, borofloat glass, boroaluminosilicate glass, low-sodium composition glasses, or a polymer. In another embodiment, the electrochromic substrate has a coefficient of thermal expansion ranging from about 2 ppm/K to about 10 ppm/K. For polymer-based substrates, the coefficient of thermal expansion can be up to about 80 ppm/K. In another embodiment, the electrochromic substrate has a coefficient of thermal expansion ranging from about 4 ppm/K to about 8 ppm/K. In another embodiment, the electrochromic glass substrate has a thickness ranging from about 0.7 mm to about 6 mm.

In another embodiment, a material for the outer laminate glass pane is selected from the group consisting of low coefficient of thermal expansion glass, soda-lime float glass, aluminosilicate glass, borofloat glass, boroaluminosilicate glass, heat-strengthened glass, tempered glass, or a polymer. In another embodiment, the outer laminate glass pane has a coefficient of thermal expansion ranging from about 2 ppm/K to about 10 ppm/K. In another embodiment, the out laminate glass pane has a thickness ranging from about 2.3 mm to about 12 mm. In another embodiment, the interlayer material is selected from the group consisting of polyvinylbutyral, ionomeric materials, ethylenevinyl acetate, polyurethanes, or mixtures thereof.

Another aspect of the invention is a laminate prepared according to the "coat-then-cut" process. In another embodiment, the laminate prepared according to the coat-then-cut process comprises a substrate having an edge strength of at least about 60 MPa.

In another aspect of the present invention, Applicants have discovered a laminate comprising: (a) an electrochromic device, said electrochromic device comprising an electrochromic stack on an annealed glass substrate; (b) an outer laminate glass pane; and (c) an interlayer material sandwiched between the electrochromic device and the outer laminate glass pane. In some embodiments, the electrochromic device has an edge strength of at least about 60 MPa. In another embodiment, the edge strength is at least about 69 MPa. In another embodiment, the edge strength is at least about 75 MPa, and in other embodiments at least about 100 MPa. In another embodiment, the electrochromic device is prepared by mechanical cutting. In another embodiment, the electrochromic device is prepared by laser cutting. In another embodiment, the electrochromic device is prepared by electrothermal cutting. In another embodiment, the laminate is part of an integrated glass unit.

In another embodiment, the annealed glass substrate and the outer laminate glass pane comprise the same material. In another embodiment, the annealed glass substrate is a different material than the outer laminate glass pane. In another embodiment, a material for the annealed glass substrate is selected from the group consisting of low coefficient of thermal expansion glass, soda-lime float glass, aluminosilicate glass, borofloat glass, boroaluminosilicate glass, low-sodium composition glass, or a polymer. In another embodiment, the annealed glass substrate has a coefficient of thermal expansion ranging from about 2 ppm/K to about 10 ppm/K. In another embodiment, the annealed glass substrate has a coefficient of thermal expansion ranging from about 4 ppm/K to about 8 ppm/K. In another embodiment, the annealed glass pane has a thickness ranging from about 0.7 mm to about 6 mm. In another embodiment, the annealed glass pane has the same thickness as the outer laminate. In another embodiment, the annealed glass pane has a different thickness than the outer laminate.

In another embodiment, a material for the outer laminate glass pane is selected from the group consisting of low coefficient of thermal expansion glass, soda-lime float glass, aluminosilicate glass, borofloat glass, boroaluminosilicate glass, heat-strengthened glass, tempered glass, or a polymer. In another embodiment, the outer laminate glass pane has a coefficient of thermal expansion ranging from about 2 ppm/K to about 10 ppm/K. In another embodiment, for polymer-based substrates, the coefficient of thermal expansion can be up to about 80 ppm/K. In another embodiment, the outer laminate glass pane has a thickness ranging from about 2.3 mm to about 12 mm.

In another embodiment, the annealed glass substrate is about the same size as the outer laminate glass pane. In another embodiment, the annealed glass substrate is smaller than the outer laminate glass pane in at least one dimension. In another embodiment, the annealed glass substrate is indented about 0.5 mm to about 3 mm relative to the outer laminate glass pane in at least one dimension. In another embodiment, the annealed glass substrate is indented about 1 mm to about 2.0 mm relative to the outer laminate glass pane in at least one dimension. In another embodiment, a perimeter of the smaller annealed glass substrate is surrounded on at least one side by interlayer material or another material, such as a polymer including silicones, urethanes, epoxies, and acrylates.

In another embodiment, the interlayer material is selected from the group consisting of polyvinylbutyral, ionomeric materials, ethylenevinyl acetate, polyurethanes, or mixtures thereof.

In another embodiment, the annealed glass substrate is soda-lime float glass having a coefficient of thermal expansion of about 8.5 ppm/K, said outer laminate glass pane is tempered soda-line float glass having a coefficient of thermal expansion of about 8.5 ppm/K, and the interlayer material is polyvinylbutyral. In another embodiment, the interlayer material is SentryGlas® Plus (SGP). In another embodiment, the annealed glass substrate is prepared by laser cutting and has an edge strength of at least 69 MPa. In another embodiment, the electrochromic stack is between the annealed glass substrate and the interlayer material. In another embodiment, the electrochromic stack is on a surface of the annealed glass substrate opposite of the interlayer material.

In another aspect of the present invention, Applicants have discovered a laminate comprising: (a) an electrochromic device, said electrochromic device comprising an electrochromic stack on a substrate; (b) an outer laminate glass pane; and (c) an interlayer material sandwiched between the electrochromic device and the outer laminate glass pane. In another embodiment, the electrochromic device is prepared by laser cutting or electrothermal cutting.

Applicants have unexpectedly found that the electrochromic device laminates (or IGUs comprising these laminates) of the present invention can withstand stresses similar to those encountered by traditional electrochromic devices manufactured on tempered or heat-treated glass substrates (or IGUs comprising such traditional electrochromic devices). As such, the EC device laminate of the present invention can withstand similar center of glass and edge stresses, and can withstand stresses of at least about 17 MPa.

In some embodiments, by withstanding similar stresses it is meant that that the electrochromic device laminates or IGUs of the present invention pass about the same industry standard tests as traditional electrochromic devices or IGUs. In other embodiments, by withstanding similar stresses it is meant that that the electrochromic device laminates or IGUs of the present invention can withstand (i) stresses safely in excess of maximum in-service thermomechanical stresses encountered in traditional EC applications, and/or (ii) at least about 50% of the same service loads or stresses as traditional EC devices or IGUs. Applicants have also surprisingly found that that these objectives can be achieved using annealed glass substrates upon which the electrochromic stack is applied or deposited.

Applicants have unexpectedly found that the improved methods of manufacturing provide for electrochromic device laminates or IGUs that can withstand service loads or stresses similar to those encountered by IGUs produced by traditional means, while providing enhanced manufacturing efficiency and meeting industry standards.

Moreover, Applicants have surprisingly discovered that annealed glass substrates can be laser cut to produce a sufficiently defect free edge that will, it is believed, endure the full range of thermal and load stresses that the EC device laminate will be subjected to during its service life. Applicants have tested the laser cut glass and the EC device laminates of FIG. 1B at the high end of the thermal and mechanical stress parameter space and have determined that laser cut, EC device laminates or substrates are highly durable and suitable for use in residential and commercial architectural applications and other applications.

Moreover, Applicants have found that the "coat-then-cut" and "cut-then-coat-then-cut" processes, both described further herein, allow for coating of large substrate panels and custom sizing after coating. Applicants have also found that this process provides improved process control and better overall uniformity of the film coatings of the EC device. Indeed, it is believed that when glass panels all having about the same dimensions are used, subsequent processing temperatures and sputtering plasma conditions for each and every panel will be about the same. This leads, it is believed, to more efficient, continuous coater or sputter operation without the need to slow or stop production or to make process adjustments for the many glass thicknesses, tints, and sizes desired. Thus, throughput rate and uptime are maximized, resulting in lower, more competitive product costs when manufacturing electrochromic devices or IGUs.

DETAILED DESCRIPTION

EC Device Laminate

One aspect of the present invention is an EC device laminate comprising an electrochromic device, the electrochromic device comprising an electrochromic stack on an EC substrate; an EC outer laminate glass pane; and an interlayer material sandwiched between the electrochromic device and the outer laminate glass pane.

The EC device laminate 29 and IGU 30 containing it are shown in FIG. 1B. EC device laminate 29 is comprised of an EC device 32 laminated to an EC outer laminate glass pane 22. Between the EC device 32 and the EC outer laminate glass pane 22 is an interlayer material 28 which bonds the EC device 32 and the outer laminate pane 22. The EC device 32 is itself comprised of an EC stack 21 which is applied or deposited on an EC substrate 31. The completed IGU 30 comprises the EC device laminate 29 together with another glass panel 20, separated by spacers 27. FIG. 1B represents a two pane IGU, however, the invention also contemplates IGUs containing three or more panes (the additional panes may be any shape or size and comprise any coating, tinted or otherwise, known in the art).

Any EC stack 21 may be used as known to those of skill in the art. Exemplary EC stacks are described, for example, in U.S. Pat. Nos. 5,321,544; 5,404,244; 7,372,610; and 7,593,154, the disclosures of which are incorporated by reference in their entirety herein.

In one embodiment, at least the EC substrate 31 of the EC device laminate 29 is comprised of annealed glass. As used herein, the term "annealed glass" means glass produced without internal stresses imparted by heat treatment and subsequent rapid cooling. This includes glass typically classified as annealed glass or float glass and only excludes heat-strengthened glass or tempered glass.

In other embodiments, both the EC substrate 31 and the EC outer laminate glass pane 22 are comprised of annealed glass. In embodiments where EC substrate 31 and EC outer laminate glass pane 22 are both comprised of annealed glass, the annealed glass utilized may be the same ("matched") or different ("mismatched"). The annealed glass substrates used may also have the same or different coefficients of thermal expansion or different types and/or amounts of dopants.

For example, in a "mismatched" embodiment, substrate 31 may be comprised of soda-lime float glass while EC outer laminate glass pane 22 is comprised of low coefficient of thermal expansion glass (low CTE glass), or vice versa. In a "matched" embodiment, by way of example, substrate 31 and EC outer laminate glass pane 22 may both be comprised of soda-lime float glass or, alternatively, both may be comprised of low CTE glass.

In addition to as defined above, the term "mismatched" also means the use of glass having different thicknesses, regardless of whether the type of glass is the same or different. For example, substrate 31 and outer laminate glass pane 22 could be of the same material, but have different thicknesses. Or, by way of example only, substrate 31 can be of a material that is different than outer laminate glass pane 22 and have different thicknesses. Further, by way of example only, substrate 31 can be of a material that is the same type as outer laminate glass pane 22 but have a different coefficient of thermal expansion and/or different thickness.

The EC substrate 31 of the present invention may be selected from traditional glass materials including soda-lime annealed glass, such as from Guardian Industries (Guardian Global Headquarters, Auburn Hills, MI), Pilkington, North America (Toledo, OH), Cardinal Glass Industries (Eden Prairie, MN), and AGC (AGC Flat Glass, Alpharetta, GI), who produce large area thin glass.

The EC substrate 31 may also be selected from materials including low CTE borofloat glass, such as that available from Schott (Schott North America Elmsford, NY), or boroaluminosilicate glasses such as Corning 1737™, and Corning Eagle XG™ (each of which are available from Corning Incorporated, Corning, NY). Moreover, the EC substrate 31 may be selected from materials including aluminosilicate glass. Those skilled in the art will be able to select other glass substrates suitable for this purpose and meeting the limitations of the claimed invention.

The EC substrate 31 may also be comprised of a polymer, copolymer, or mixtures of one or more polymers or copolymers. Nonlimiting examples of polymers include polyimide, polyethylene, napthalate (PEM), polyethylene teraphthallate (PET), aramid or other similar polymer materials. Those skilled in the art will be able to select other polymeric substrates suitable for this purpose and meeting the limitations of the claimed invention.

In general, the EC substrate 31 may have any thickness depending on the desired application (e.g. residential architectural window, commercial architectural window, or even an automotive window) and desired thermal/structural properties. Typically, substrate 31 has a thickness ranging between about 0.7 mm and about 6 mm. In some embodiments, EC substrate 31 has a thickness ranging from between about 1.5 mm and about 2.3 mm.

In some embodiments, the annealed glass or soda-lime float glass utilized has a coefficient of thermal expansion (CTE) of between about 7.0 ppm/K and about 10.0 ppm/K. In other embodiments, the soda-lime float utilized glass has a CTE of between about 8.2 ppm/K and about 9.0 ppm/K. In some embodiments utilizing low-CTE glasses, the coefficient of thermal expansion ranges from about 2.0 ppm/K to about 6.4 ppm/K. In some specific embodiments utilizing low-CTE glasses, the coefficient of thermal expansions are as follows: Corning 1737 (about 3.76 ppm/K), Corning EagleXG™ (about 3.2 ppm/K) and Schott Borofloat 33™ (about 3.3 ppm/K).

The EC outer laminate glass pane 22 of the present invention may be selected from materials including heat-strengthened glass, tempered glass, partially heat-strengthened or tempered glass, or annealed glass. "Heat-strengthened glass" and "tempered glass", as those terms are known in the art, are both types of glass that have been heat treated to induce surface compression and to otherwise strengthen the glass. Heat-treated glasses are classified as either fully tempered or heat-strengthened. According to Federal Specification DD-G-1403B, fully tempered glass must have a surface compression of about 69 MPa or more for an edge compression of about 67 MPa or more. It is believed that heat-strengthened glass must have a surface compression between about 24 and about 69 MPa, or an edge compression between about 38 and about 67 MPa. The fracture characteristics of heat-strengthened glass, it is believed, vary widely and fracture can occur at stresses from about 41 to above 69 MPa.

In general, the EC outer laminate glass pane 22 may have any thickness depending on the desired application (e.g. residential architectural window or commercial architectural window) and desired thermal/structural properties. In some embodiments, the EC outer laminate pane 22 may be comprised of plastics, including polycarbonates. Typically, the EC outer laminate glass pane 22 has a thickness ranging between about 2.3 mm and about 12 mm. In some embodiments, EC outer laminate glass pane 22 has a thickness ranging from between about 2.3 mm and about 6 mm. Of course, thicker glass may be utilized should the application require it, e.g. when used in architectural applications experiencing high wind loads or for ballistic- or blast-resistant applications.

In some embodiments, the annealed glass or soda-lime float glass utilized has a coefficient of thermal expansion (CTE) of between about 7.0 ppm/K and about 10.0 ppm/K. In other embodiments, the soda-lime float glass has a CTE of between about 8.2 ppm/K and about 9.0 ppm/K. In some embodiments utilizing low-CTE glasses, the coefficient of thermal expansion ranges from about 2.0 ppm/K to about 6.4 ppm/K. In some specific embodiments utilizing low-CTE glasses, the coefficient of thermal expansions are as follows: Corning 1737™, about 3.76 ppm/K; Corning EagleXG™, about 3.2 ppm/K; and Schott Borofloat 33™, about 3.3 ppm/K.

In some embodiments, the EC substrate 31 and EC outer laminate glass pane 22 have about the same coefficient of thermal expansion (CTE). In other embodiments, the EC substrate 31 and EC outer laminate glass pane 22 have different CTEs. In other embodiments, the EC substrate 31 and EC outer laminate glass pane 22 have a coefficient of thermal expansion that differs by less than about 50%. In yet other embodiments, the EC substrate 31 and EC outer laminate glass pane 22 have a coefficient of thermal expansion that differs by less than about 30%. In further embodiments, the EC substrate 31 and EC outer laminate glass pane 22 have a coefficient of thermal expansion that differs by less than about 20%. In yet further embodiments, the EC substrate 31 and EC outer laminate glass pane 22 have a coefficient of thermal expansion that differs by less than about 10%. As discussed herein, the selection of an appropriate interlayer material 28 may assist in mitigating any stresses caused by a CTE mismatch.

Figure 2:
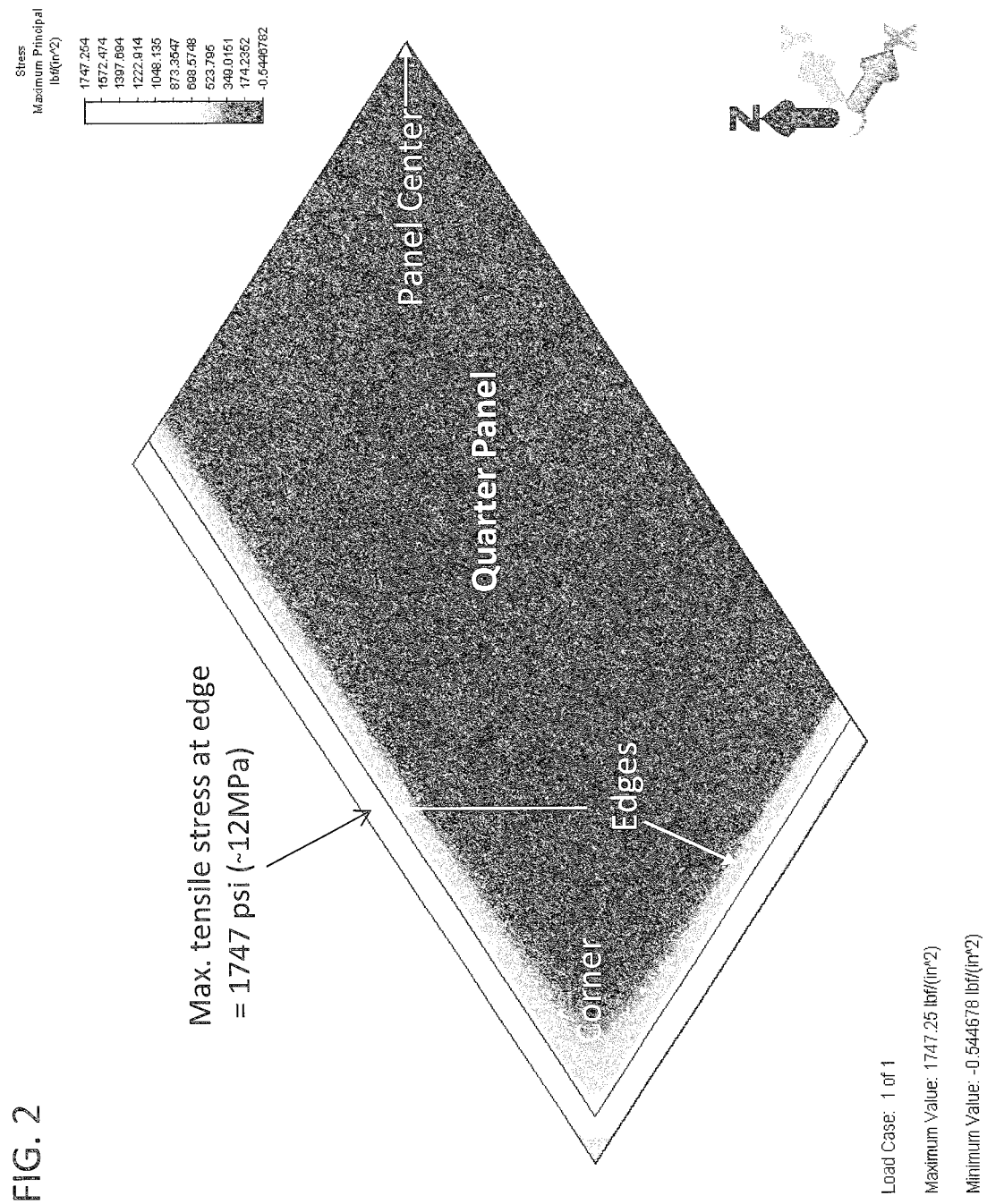
FIG. 2 is a plot of stress distribution of an EC laminate comprising a low coefficient of thermal expansion glass laminated to a soda-lime glass.
Figure 3A:
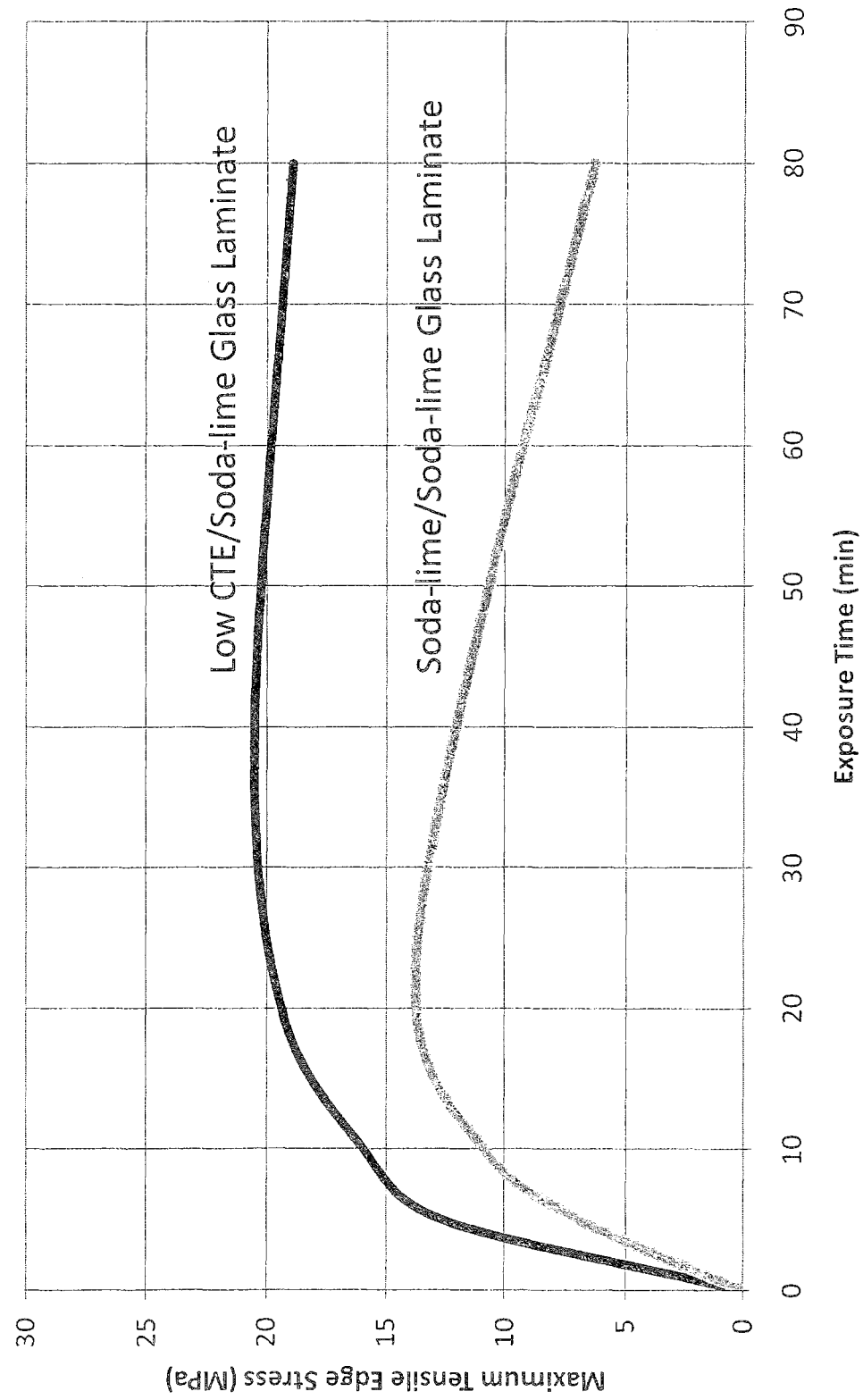
FIG. 3a is a plot of EC laminates comparing peak edge tensile stresses for several laminates exposed to solar irradiation.
Figure 3B:
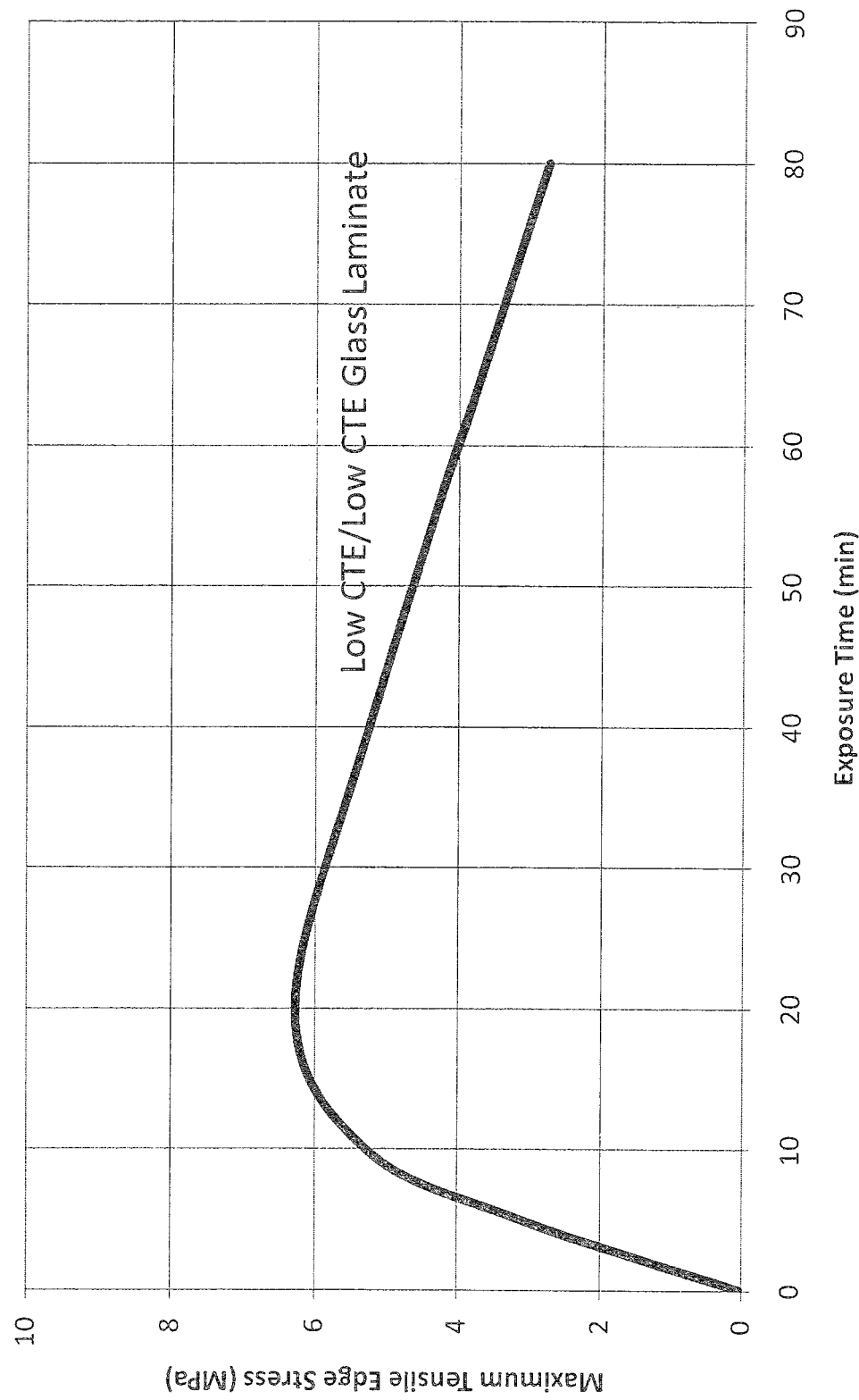
FIG. 3b is a plot of an EC laminate comparing peak edge tensile stresses for several laminates exposed to solar irradiation.

For example, FIG. 2 shows the stress distribution of a laminate when low CTE glass is used as the EC substrate 31, soda-lime glass is used as the EC outer laminate pane 22, and polyvinylbutyral is used as the interlayer material 28. The simulation shows the shadowing effect of a 25 mm frame around the edge of the panel. It is believed that the frame causes a temperature gradient between the edge and center of the laminate, thereby, it is believed, causing formation of edge stresses. In the case of a laminate structure, a mismatch in CTE causes additional stresses as solar absorption causes the device to heat up. The effect of this CTE mismatch is shown in FIG. 3a, in which a solar absorbing low CTE/soda-lime glass laminate subject to 1000 W/m incident radiation has a higher peak stress level compared to a soda-lime/soda-lime laminate structure under the same solar absorption conditions, also shown in FIG. 3a. As shown in these examples, maximum edge stress changes over time as the EC laminate absorbs more solar radiation, up to a maximum stress of about 20.5 MPa after approximately 40 minutes. At longer times, heat conduction through the glass from the exposed region to the shadowed edge region will cause the temperature to equilibrate and corresponding thermal stresses to decrease from their peak level. It is believed that these stresses may be reduced when two low CTE panels are laminated together, such as shown in FIG. 3b, under the same edge frame shadow and solar absorption conditions as shown in FIG. 3a.

In preferred embodiments, the edge of EC substrate 31 is protected from handling and mechanical damage. Without wishing to be bound by any particular theory, it is believed that if the edges of EC substrate 31 are significantly nicked or chipped, the overall strength of the EC device could be compromised. In some embodiments of the present invention, the EC substrate 31 is indented relative to EC outer laminate glass pane 22. In other embodiments, the size of the EC substrate 31 is slightly smaller than the size of the EC outer laminate glass pane 22, in at least one dimension, preferably in at least two dimensions, and more preferably in all dimensions. In some embodiments, EC substrate 31 is indented about 0.5 mm to about 3 mm in at least one dimension, and preferably about 0.5 mm to about 3 mm around the perimeter, with respect to glass pane 22. In other embodiments, EC substrate 31 is indented about 1 mm to about 2.0 mm, in at least one dimension, and preferably about 1 mm to about 2.0 mm around the perimeter with respect to glass pane 22.

In some embodiments, the depth of the indentation is determined by the automated placement tolerances of the two pieces of glass during the lamination layup/manufacturing process as well as any slight movements incurred during the thermal lamination process. In some embodiments, during thermal processing the interlayer material is allowed to flow around the edge of EC substrate 31 providing an element of protection which, it is believed, further protects the EC device laminate 29 from damage during shipment and installation. In some embodiments, excess interlayer material is added to achieve this. In other embodiments, additional protective materials can be deposited around the perimeter of the EC device such as polymers (including but not limited to epoxies, urethanes, silicones, and acrylates). These materials can be applied in varying amounts to achieve the desired outcome.

The interlayer material may be selected from any material which allows for the EC device 32 to be laminated, by those methods known in the art, to the EC outer laminate glass pane 22. In general, the interlayer material 28 should possess a combination of characteristics including: (a) high optical clarity; (b) low haze; (c) high impact resistance; (d) high penetration resistance; (e) ultraviolet light resistance; (f) good long term thermal stability; (g) sufficient adhesion to glass and/or other polymeric materials/sheets; (h) low moisture absorption; (i) high moisture resistance; (j) excellent weatherability; and (k) high stress load resistance (e.g. impact loading or windloading). In some embodiments, the interlayer material 28 at least provides sufficient adhesion to both the EC device 32 and EC outer laminate glass pane 22 in order to prevent delamination during in-service stress loads and also be selected such that it does not negatively affect the visual characteristics of the EC device laminate 29.

In other embodiments, the interlayer material should be selected such that industry standard performance criteria is satisfied for both loading modes (see, for example, ANSI Z97.1 for impact testing and ASTM E1300 for windload criteria).

In one embodiment, a suitable interlayer material 28 is polyvinylbutyral (PVB), available from Solutia Inc. (St. Louis, Missouri) under the trade name Saflex™. PVB is also available from DuPont (Wilmington, DE) under the trade name Butacite™. Other suitable materials for interlayer material 28 include ionomeric materials such as SentryGlas Plus™ (SGP) from DuPont, ethylenevinyl acetate (EVA) and cross-linking polyurethanes (e.g. cast-in-place resins) or thermoplastic polyurethanes. Of course, mixtures of any of the above identified materials may be used. In addition, other polymer materials can be used as an interlayer material 28 provided that they satisfy at least some of the thermo-mechanical, adhesion, and optical transparency functional requirements recited above. This also includes interlayer materials composed of composite polymer layers designed for improved sound attenuation, ballistic-resistant and blast-resistant applications. These materials are readily available to those of skill in the art.

In other embodiments, the interlayer material 28 may include silicones and epoxies.

If, for example, the EC substrate 31 and EC outer laminate glass pane 22 are comprised of the same material, it is believed that both glass panels would have about the same coefficient of thermal expansion. Where the materials differ, i.e. a mismatch situation such as in FIG. 2, without wishing to be bound by any particular theory, it is believed that the selection of an appropriate interlayer material 28 could affect the transfer or distribution of stress between the mismatched glass panels and therefore, it is believed, relieve at least some of the stresses present at various points in the laminate.

For lamination structures that involve a coefficient of thermal expansion (CTE) mismatch between the panes of glass, it is believed that the interlayer should be selected such that it either be (1) compliant enough not to transmit tensile stresses from the higher CTE glass panel to the lower CTE glass panel; or (2) stiff enough from the lamination temperature such that compressive stresses would be transmitted from the high CTE glass panel to the low CTE glass panel during cooling with negligible polymer mechanical relaxation at low temperatures.

FIGS. 3a and 3b provide a comparison of peak edge tensile strength for a laminate (where the component panels in this case have thicknesses of 0.7 mm and 6 mm, respectively) exposed to solar irradiation, with the edges shadowed by a 1" window/architectural frame. Matched (low CTE/low CTE; soda-lime/soda-lime) and mismatched (low CTE/soda-lime) examples are shown as a function of time. For a stiff interlayer material (stress-transmitting), the effective stress for the low CTE/soda-lime combination may be larger than for the soda-lime/soda-lime combination. As such, it is believed that the resulting edge stress may depend on the thermo-mechanical properties of the interlayer material.

The EC device laminates 29 (or IGUs 30 comprising these laminates) are believed to withstand stresses similar to those encountered by traditional electrochromic devices manufactured on tempered or heat-treated glass substrates (or IGUs comprising such traditional electrochromic devices).

In some embodiments, by withstanding similar stresses it is meant that that the EC device laminates 29 or IGUs 30 of the present invention pass about the same industry standard tests as traditional electrochromic devices or IGUs. In other embodiments, by withstanding similar stresses it is meant that that the EC device laminates 29 or IGUs 30 of the present invention can withstand (i) stresses safely in excess of maximum in-service thermomechanical stresses encountered in traditional EC applications, and/or (ii) at least about 50% of the same service loads or stresses as traditional electrochromic devices or IGUs. In some embodiments, the EC device laminate 29 is able to withstand a thermal edge stress (or service load) of at least about 17 MPa. In other embodiments, the EC device laminate is able to withstand a thermal edge stress of at least about 21 MPa. In some embodiments, the EC device 29 has an edge strength of at least about 60 MPa. In other embodiments, the EC device or EC substrate has an edge strength of at least about 69 MPa. In yet other embodiments, the EC device or EC substrate has an edge strength of at least about 75 MPa. In even further embodiments, the EC device or EC substrate has an edge strength of at least about 100 MPa.

In some embodiments, the EC laminate 29 or EC substrate 31 is part of an IGU. The glass panel 20, which is used to form the IGU, may be selected from any material, including glasses or plastics, traditionally used in IGU structures. For example, any kind of glass (soda-lime glass, low CTE glass, tempered glass, and/or annealed glass) or plastic may be used. Moreover, the glass panel 20 may itself be a multipane laminate of one or more materials (multiple panes of glass, multiple panes of plastic, alternating glass, plastic panes in any order). The glass panel 20 may also be tinted with any color or coated on one or both sides in any traditional manner, such as chemical or physical vapor deposition coating. The glass panel 20 may be an electrochromic or thermochromic device. The glass panel 20 may be laser cut or be mechanically scribed. Moreover, IGU 30 of FIG. 1B may be a triple pane IGU, i.e. an IGU containing an additional glass (or polymer, e.g. acrylic) panel 20 adjacent to one of glass panel 20 or EC device laminate 29, but separated by spacers. Glass panel 20 may have any thickness or have any properties, provided it meets minimum commercial or residential building codes and/or window standards.

Methods of Manufacturing

"Coat-then-Cut"

In one embodiment of the proposed invention, Applicants have discovered a manufacturing approach which involves the concept of 'coat-then-cut'. In one aspect is a process of manufacturing an electrochromic device laminate comprising providing an electrochromic substrate; fabricating a plurality of electrochromic device precursors on the substrate; cutting each of the electrochromic device precursors into individual electrochromic devices, and laminating each of the individual electrochromic devices to a separate outer laminate glass pane. As used herein, an "electrochromic device precursor" is an EC device, typically a stack of thin films as described above, applied or deposited on a substrate prior to the cutting of that substrate into individual EC devices. As such, multiple EC device precursors are fabricated on any single substrate, or as described herein, substrate daughter pane. Typically, the EC precursor layout is designed to incorporate sufficient space between the precursors to allow for cutting, preferably without damaging any films or the stack in general.

In some embodiments, the EC device (or precursor) 32 is produced, in general, by coating or applying the EC stack 21 on a large substrate panel 31, such as annealed glass. The stack may be applied or deposited according to those methods known in the art and as incorporated herein. The EC device (or precursor) 32 is then subsequently cut (by traditional mechanical means, by laser cutting, or by electrothermal cutting methods, detailed herein) to a desired dimension depending on the ultimate application. Of course, the panel may be cut into any size or shape. The substrate may also have been pre-cut from a larger panel. The device 32 is then laminated to an EC outer laminate glass pane 22, preferably to provide additional mechanical strength. The EC laminate 29 can be constructed with the EC device substrate 32 as shown in FIG. 1B (i.e. with the EC film stack 21 on the outside of the EC laminate 29) or alternatively, the EC laminate 29 can be constructed with the EC device substrate 32 oriented with the EC film stack 21 in contact with the interlayer material 28 (i.e. the EC film stack on the inside of the laminate).

Once the EC device laminate 29 is processed, it is optionally combined with glass 20 to form an IGU 30.

In some embodiments, the EC outer laminate glass pane is about the same size as the EC device. In other embodiments, the EC outer laminate glass pane is a different size than the EC device. In some embodiments, the EC substrate is indented relative to the outer glass pane, as described above. As further detailed herein, the EC outer laminate glass may have about the same or different thicknesses and/or coefficients of thermal expansion as the EC device (or the substrate on which the EC device is deposited). The outer laminate glass pane may be mechanically cut or laser cut. Another aspect of the invention is a laminate made according to this process.

"Cut-Then-Coat-Then-Cut"

In another embodiment of the proposed invention, Applicants have discovered a manufacturing approach which involves first cutting a large panel of an EC substrate into one or more substrate daughter panels, followed by applying the 'coat-then-cut' concept described above, such as to each of the one or more substrate daughter panels (this process is hereinafter referred to as a "cut-then-coat-then-cut" process).

As such, another aspect of the present invention is a process of manufacturing an electrochromic device laminate comprising providing an electrochromic substrate; cutting the electrochromic substrate into one or more substrate daughter panels; fabricating a plurality of electrochromic device precursors on each of the one or more substrate daughter panels; cutting each of the electrochromic device precursors into individual electrochromic devices; and laminating each of the individual electrochromic devices to a separate outer laminate glass pane.

In some embodiments, a large substrate panel of annealed glass is cut into one or more substrate daughter panels. In other embodiments, a large substrate panel of annealed glass is cut into a plurality of substrate daughter panels. Each of the substrate daughter panels may be about the same size and/or shape, or may be different sizes and/or shapes. For example, the initial large EC substrate may be cut into three equally sized substrate daughter panels or may be cut into three substrate daughter panels with each having a different size. At least some of the edges of the substrate daughter panels may then undergo an optional edge grinding process, followed preferably, by washing. In other embodiments, the large substrate panel is cut into a single smaller (in at least one dimension) substrate daughter panel.

In some embodiments, the substrate daughter panels are loaded onto carriers for further processing, i.e. fabrication of the EC device precursors by coating each of the substrate daughter panels with an EC stack as described herein. Any number of substrate daughter panels may be loaded onto any single carrier, but it is preferred to optimize the surface area of the carrier with as many substrate daughter panels as will fit. Each of the EC device precursors on each of the substrate daughter panels are then further cut, such as by a laser or electrothermal cutting, or by mechanical means.

It is believed that the cut-then-coat-then-cut process provides several advantages. First, it is typical that the glass substrate is held at a slight angle during a sputtering process (usually between about 5 degrees and 9 degrees relative to vertical). This angle could lead to a deflection which could ultimately lead to non-uniform coatings due to the bowing of glass. It is believed that this bowing of glass increases as the size of the glass increases. As such, applying coatings (e.g., EC stacks) via sputtering on smaller pieces of glass, first cut from a larger substrate panel, could assist in alleviating any potential non-uniformity. In some embodiments, the substrate glass is held vertically during coating. Without wishing to be bound by any particular theory, it is also believed that bowing could be caused by thermal stresses. It is believed that any thermal stresses could likewise be reduced by using substrate daughter panels, preferably smaller substrate daughter panels.

Second, certain desired substrate glass sizes (or shapes) are not always available from a manufacturer. For example, glass from a manufacturer may be too large to fit in a carrier or in a reactive sputtering chamber. Moreover, it may be more cost effective to buy larger pieces of glass and first cut them to fit into a carrier.

Third, it is believed that the edges of the as-received glass may not always be in a condition suitable for immediate processing. In these cases, it is desirable to first cut the glass into smaller daughter panels having a defect free edge or an edge that meets downstream manufacturing and processing requirements.

Fourth, any piece of large glass may contain a defect. A glass panel(s) without the defect can be cut from the large glass panel, without wasting large amounts of glass or processing time.

The lamination step in the "coat-then-cut" and the "cut-then-coat-then-cut" processes are carried out using methods known to those of skill in the art. For example, typical lamination processes include heating the laminate under moderate pressures to create a partial bond between the glass panels, e.g. a nip roller process, followed by an extended bonding process, e.g. using an autoclave, at elevated temperatures and pressures to complete the bonding to the glass and either remove residual air or dissolve the air into the polymer structure to create an optically-clear interlayer. Other approaches utilize either: (i) a vacuum process combined with heating to remove air from the interlayer region and bond the glass panels, or (ii) a polymer that is poured into the gap between the glass panels that fills the capillary space between to create a transparent interlayer.

Conventional Mechanical Scribe or Cutting

Typical glass preparation involves creating a cut on the surface of the glass panel using a carbide or a diamond tip scribe or wheel, then applying a bending moment to propagate surface cracks along the edge to create, it is believed, a straight cut. The edges of glass are often ground using a grinder or silicon carbide sanding belt.

Laser Cutting

In some embodiments of the present invention, a laser is used to cut the EC device laminate 29 or the EC substrate 31. As used herein, the term "laser cut" means (i) using a laser to create a thin crack perpendicular to the substrate surface which is subsequently propagated through the glass by an applied bending moment to produce a complete separation, or (ii) a complete cut through the glass by a laser-induced crack that is propagated along the length of the substrate to complete separation. The process of laser cutting is equally applicable to the "coat-then-cut" and the "cut-then-coat-then-cut" processes.

Thus, in one aspect of the present invention is a process of manufacturing an electrochromic device laminate comprising providing an electrochromic substrate; fabricating a plurality of electrochromic device precursors on the substrate; laser cutting each of the electrochromic device precursors into individual electrochromic devices; and laminating each of the individual electrochromic devices to a separate outer laminate glass pane. In some embodiments, the laser cutting process involves either inducing a thin surface crack later propagated to separation by application of a bending moment, or a complete "cut-through" by initiating and propagating a crack along the substrate to complete separation with no subsequent bending or "breakout" required.

More specifically, a thermally tough, innovative laminated outer glazing is fabricated using a focused laser beam to facilitate cutting of the coated glass substrates into individual daughter panes. Without wishing to be bound by any particular theory, it is believed that the laser energy locally heats the glass followed by rapid cooling along the separation lines. This results in crack formation perpendicular to the glass resulting in an edge that is free of chips and additional microcracks that may cause contamination and edge weakening, respectively. The resultant laser processed edge does not require any additional edge finishing.

In some embodiments, it is believed that the laser-cut edges can withstand stresses about 2 to about 3 times higher than standard mechanically cut edges and, it is believed, are of comparable edge strength to heat-strengthened glass.

Consequently, it is believed that the laser cut, untempered EC device substrates can withstand temperature variations, and hence the stresses associated with such temperature variations, that are typically generated in the field when the glass is deeply tinted.

In some embodiments, the laser cut panels are able to withstand stresses of at least about 60 MPa. In other embodiments, the laser cut panels are able to withstand stresses of at least about 69 MPa. In yet other embodiment, the laser cut panels are able to withstand stresses of at least about 75 MPa. In yet other embodiment, the laser cut panels are able to withstand stresses of at least about 100 MPa. In even further embodiments, the laser cut panels are able to withstand stress of between about 70 MPa and about 310 MPa.

Electrothermal Cutting

In some embodiments of the present invention, electrothermal cutting (ETC) is used to cut or separate the ED device laminate 20 or the EC substrate 31. ETC refers to a method of heating (and where required, evaporating) small regions within an insulating or semiconducting substrate. In some embodiments, the glass is cut by the application of an AC electrical discharge between two electrodes. Without wishing to be bound by any particular theory, it is believed that the high voltage locally heats the glass and a cooling head causes suitable stress to create a through crack to form. The electrode/cooling head assembly is then moved in a defined path to propagate the crack (controlled separation) in the desired pattern defined by the custom size of the required EC substrate or EC substrate daughter panel.

In some embodiments, the panels cut by ETC are able to withstand stresses similar to those cut by laser. In other embodiments, the panels cut by ETC are able to withstand stresses of at least about 60 MPa. In yet other embodiments, the panels cut by ETC are able to withstand stresses of at least about 69 MPa. In further embodiments, the panels cut by ETC are able to withstand stresses of at least about 75 MPa. In yet further embodiments, the panels cut by ETC are able to withstand stresses of at least about 80 MPa. In even further embodiments, the panels cut by ETC are able to withstand stresses of at least about 100 MPa.

EXPERIMENTAL DATA AND EXAMPLES

Laminate Impact Testing Results

Figure 4:
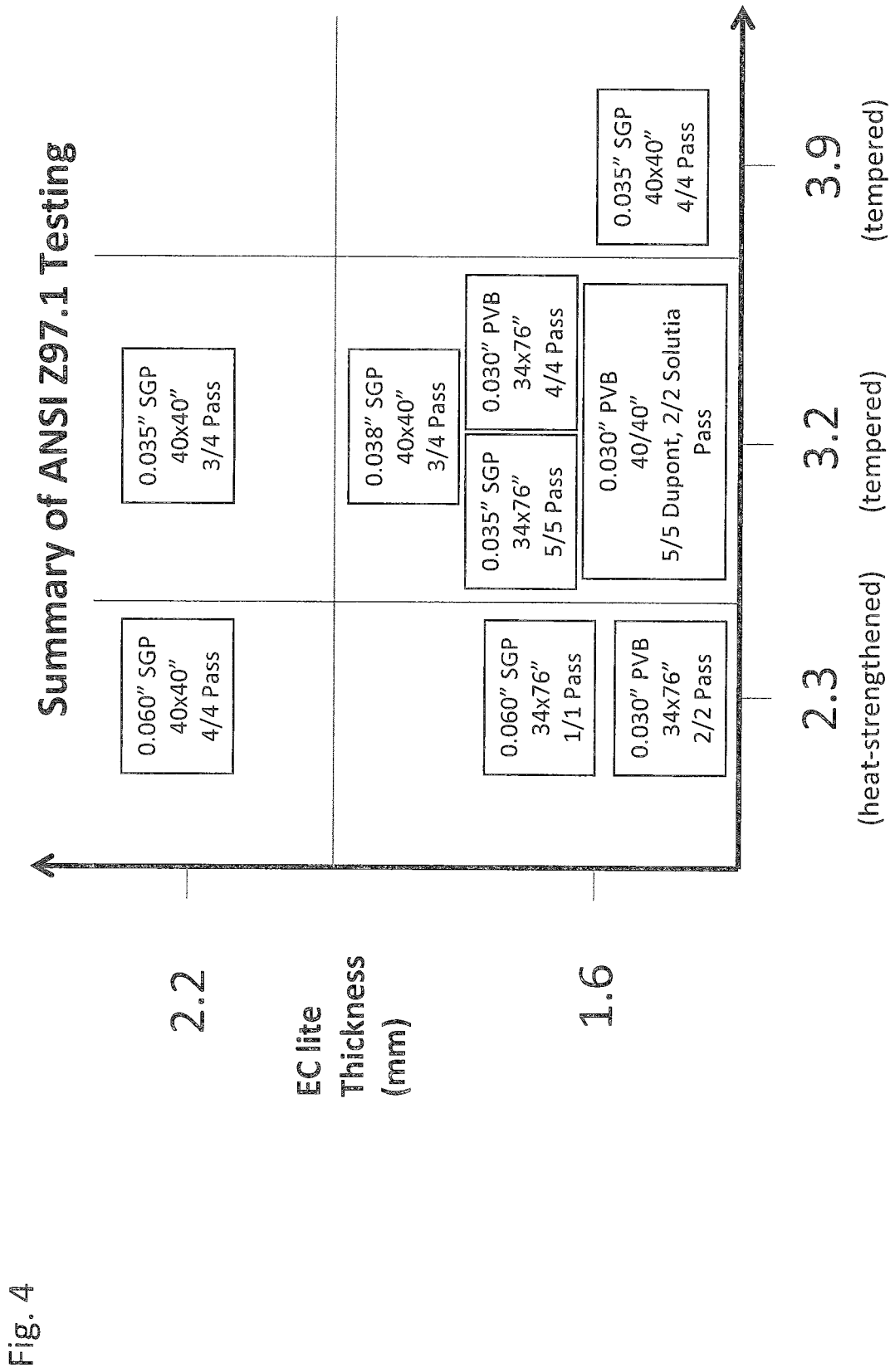
FIG. 4 provides a summary of impact testing as a function of EC substrate, EC outer laminate glass pane, and interlayer thicknesses.

Impact testing was performed on "mismatched" laminates comprising: (1) an EC substrate 31, comprised of annealed soda-lime float glass or low-CTE glass; and (2) an EC outer laminate glass pane 22, comprised either of a heat strengthened glass, tempered glass, or annealed glass, as shown in FIG. 4. The impact data suggest a useful design window with respect to EC substrate 31 and EC outer laminate glass pane 22 thicknesses. Polyvinylbutyral (PVB) and ionomer polymers (SGP from DuPont) were tested as interlayer materials 28. The SGP showed a narrower design window with respect to EC substrate/support substrate and interlayer thickness compared to PVB which, without wishing to be bound by any particular theory, it is believed better PVB performance is related to the enhanced compliance/stretching of the PVB material.

FIG. 4 summarizes impact testing data as function of EC substrate 31, EC outer laminate glass pane 22, and interlayer 28 thickness. FIG. 4 demonstrates different combinations of EC substrate 31 thickness, EC outer laminate glass pane 22 thickness and interlayer material 28 thickness. For the 34"×76" test geometry required by ANSI Z97.1-2004, the data suggested application over a wide range of glass and interlayer thicknesses. It is believed that PVB, is more robust with respect to glass and interlayer thicknesses.

The most widely referenced test standard for lamination glazing is issued by American National Standards Institute standard, ANSI Z97.1-2004 (American National Standard for Safety Glazing Materials Used in Buildings—Safety Performance Specifications Method of Test). This standard establishes both the specifications and methods of testing for safety glazing materials as used for building and architectural purposes. The testing involves impact of a 100 pound bag of lead shot held at the end of a tether and swung into the centerline of a laminated glass panel. There is an additional standard issued by the Consumer Products Safety Council (CPSC), 16CFR1201, that uses the same test methodology but has slightly different pass/fail criteria.

The pass/fail criteria for the Z97.1 and 16CFR1201 tests are slightly different. The Z97.1 test allows breakage and formation of a tear/hole smaller than would allow a 3-inch diameter ball to pass through. The 16CFR1201 test additionally requires that a 3-inch ball weighing 4 pounds will not fall through the opening after 1 second duration when the panel is in a horizontal position. The pass/fail data reported are based on Z97.1 criteria, but the rigidity of the laminate would, we believe, allow for a 16CFR1201 pass.

Both tests have different categories, depending on the height of the bag drop. We present results from the most extreme test involving a drop from a height of 48" (400 foot-pounds). Typical test panel sizes are 34"×76" although another size (40"×40") was also tested. The 40"×40" geometry represents a more challenging test. All glass substrates for impact testing in Examples 1-8, which follow, were cut by mechanical scribing. Testing was performed at SAGE of Faribault, MN and at CardinalLG in Amery, Wisconsin.

EXAMPLES

Example 1—EC Laminate

| Component | Material | Properties |
|---|---|---|
| EC outer laminate glass pane | Fully tempered soda-lime glass | Thickness: 3.2 mm CTE: 8.5 ppm/K |
| EC substrate | Annealed soda-lime float glass | Thickness: 1.7 mm CTE: 8.5 ppm/K |
| Interlayer material | PVB | Thickness: 0.76 mm |

Method of Manufacture:

The laminated EC structure of Example 1 was manufactured according to a "cut-then-coat" process. The lamination was performed using a conventional nip roller/autoclave process. Equivalent results could be obtained using a vacuum laminating process.

Results:

The laminated EC structure having the components detailed above passed the ANSI Z97.1 standard for impact testing.

Example 2—EC Laminate

| Component | Material | Properties |
|---|---|---|
| EC outer laminate glass pane | Fully tempered soda-lime glass | Thickness: 4 mm CTE: 8.5 ppm/K |
| EC substrate | Annealed soda-lime float glass | Thickness: 1.7 mm CTE: 8.5 ppm/K |
| Interlayer material | PVB | Thickness: 0.76 mm |

Method of Manufacture:

The laminated EC structure of Example 2 was manufactured according to a "cut-then-coat" process. The lamination was performed using a conventional nip roller/autoclave process.

Results:

The laminated EC structure having the components detailed above passed the ANSI Z97.1 standard for impact testing.

Outer laminate panels having different thicknesses were tested in Examples 1 and 2, with the resulting laminates both passing impact testing. Equivalent results could be obtained using a vacuum laminating process.

Example 3—EC Laminate

| Component | Material | Properties |
|---|---|---|
| EC outer laminate glass pane | Fully tempered soda-lime glass | Thickness: 3.2 mm CTE: 8.5 ppm/K |
| EC substrate | Annealed soda-lime float glass | Thickness: 1.7 mm CTE: 8.5 ppm/K |
| Interlayer material | SentryGlas Plus (DuPont) | Thickness: 0.89 mm |

Method of Manufacture:

The laminated EC structure of Example 3 was manufactured according to a "cut-then-coat" process. The lamination was performed using a conventional nip roller/autoclave process.

Results:

The laminated EC structure having the components detailed above passed the ANSI Z97.1 standard for impact testing. Equivalent results could be obtained using a vacuum laminating process.

Example 4—EC Laminate

| Component | Material | Properties |
|---|---|---|
| EC outer laminate glass pane | Fully tempered soda-lime glass | Thickness: 4 mm CTE: 8.5 ppm/K |
| EC substrate | Annealed soda-lime float glass | Thickness: 1.7 mm CTE: 8.5 ppm/K |
| Interlayer material | SentryGlas Plus (DuPont) | Thickness: 0.89 mm |

Method of Manufacture:

The laminated EC structure of Example 4 was manufactured according to a "cut-then-coat" process. The lamination was performed using a conventional nip roller/autoclave process.

Results:

The laminated EC structure having the components detailed above passed the ANSI Z97.1 standard for impact testing.

Outer laminate panels having different thicknesses were tested in Examples 3 and 4, with the resulting laminates both passing impact testing. Equivalent results could be obtained using a vacuum laminating process.

Example 5—EC Laminate

| Component | Material | Properties |
|---|---|---|
| EC outer laminate glass pane | Fully tempered soda-lime glass | Thickness: 4 mm CTE: 8.5 ppm/K |
| EC substrate | Annealed borofloat CTE float glass | Thickness: 1.7 mm CTE: 3.3 ppm/K |
| Interlayer material | PVB | Thickness: 0.76 mm |

Method of Manufacture:

The laminated EC structure of Example 5 was manufactured according to a "cut-then-coat" process. The lamination was performed using a conventional nip roller/autoclave process.

Results:

The laminated EC structure having the components detailed above passed the ANSI Z97.1 standard for impact testing. Equivalent results could be obtained using a vacuum laminating process.

Example 6—EC Laminate

| Component | Material | Properties |
|---|---|---|
| EC outer laminate glass pane | Heat-strengthened soda-lime float glass | Thickness: 2.3 mm CTE: 8.5 ppm/K |
| EC substrate | Annealed soda-lime float glass | Thickness: 1.7 mm CTE: 8.5 ppm/K |
| Interlayer material | SentryGlas Plus (DuPont) | Thickness: 1.5 mm |

Method of Manufacture:

The laminated EC structure of Example 6 was manufactured according to a "cut-then-coat" process. The lamination was performed using a conventional nip roller/autoclave process.

Results:

The laminated EC structure having the components detailed above passed the ANSI Z97.1 standard for impact testing. Equivalent results could be obtained using a vacuum laminating process.

Example 7—EC Laminate

| Component | Material | Properties |
| --- | --- | --- |
| EC outer laminate glass pane | Heat-strengthened soda-lime float glass | Thickness: 2.3 mm CTE: 8.5 ppm/K |
| EC substrate | Annealed soda-lime float glass | Thickness: 1.7 mm CTE: 8.5 ppm/K |
| Interlayer material | PVB | Thickness: 0.76 mm |

Method of Manufacture:

The laminated EC structure of Example 7 was manufactured according to a "cut-then-coat" process. The lamination was performed using a conventional nip roller/autoclave process.

Results:

The laminated EC structure having the components detailed above passed the ANSI Z97.1 standard for impact testing. Equivalent results could be obtained using a vacuum laminating process.

Example 8—SageGlass® EC Device

| Component | Material | Properties |
| --- | --- | --- |
| Interior Glass of IGU | fully tempered soda-lime float glass | Thickness: 6 mm CTE: 8.5 ppm/K |
| EC substrate | fully tempered soda-lime float glass | Thickness: 6 mm CTE: 8.5 ppm/K |

Method of Manufacture:

The IGU of Example 8 was manufactured according to the standard manufacturing processes described herein.

Results:

The IGU having the components detailed above passed the ANSI Z97.1 standard for impact testing.

It has been observed that the laminated IGUs of Examples 1-7 and the traditional IGU of Example 8 all passed ANSI Z97.1 for impact testing. Thus, it is believed that the EC device laminates (and IGUs comprising them) of the present invention are capable of meeting/exceeding all critical industry mechanical performance requirements for architectural applications.

Figure 5:
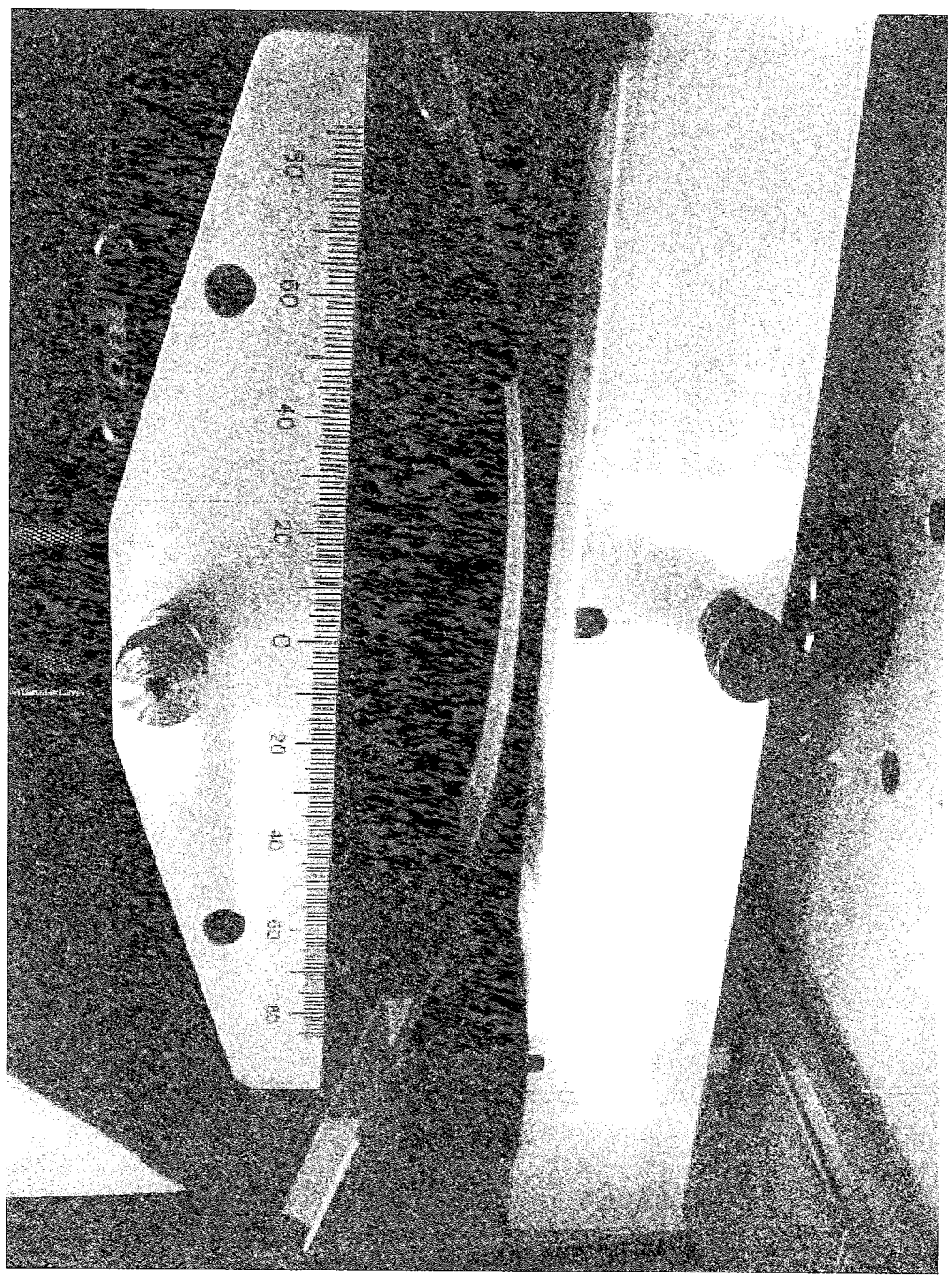
FIG. 5 provides an example of a four-point bend test showing a laser-cut glass sample under testing conditions.

Comparison of Mechanically-Scribed Annealed, Laser-Cut Annealed and Heat-Strengthened Soda-Lime Float Glass Edge Strength We have evaluated laser cut edge strength for a variety of glass compositions, substrate thicknesses and mechanical testing sample orientations. The best quantitative measurement of edge strength for laser cut glass has been performed using a four-point bend test setup. In the four-point bend, an example using a 'lying down' sample orientation shown in FIG. 5, the entire region under the inner span is subjected to the same bending moment, and therefore, it is believed, allows for a larger effective area to be interrogated. We have tested edge strength in both 'edge-on' and 'lying down' orientations. The 'edge-on' orientation was initially used because it allows for testing of both top and bottom edges at the same time, in similar stress conditions as would be seen in service. However, we have found excellent agreement with data in both test orientations, and since the 'lying down' is easier to test using a conventional four-point bend test fixture, we have tested the majority of test samples in the 'lying down' orientation. Typical sample dimensions were 25 mm wide and 330 mm long with an effective test region of about 100 mm. We have examined a variety of different glass thicknesses (ranging from approximately 1 mm to 2.3 mm) and glass compositions including standard soda-lime float glass from various manufacturing sources, and low CTE glasses including Eagle2000™ and EagleXG™ (manufactured by Corning) and Borofloat33™ (manufactured by Schott Glass).

We have compared our laser cut edge strength data on soda-lime glass to edge strength literature values for annealed, heat-strengthened and fully tempered soda-lime glasses. Veer et al. has recently published a comprehensive experimental study comparing annealed, heat-strengthened and tempered glass. Veer, F A, P C Louter and F P Bos, "*The strength of annealed, heat-strengthened and fully tempered float glass,*" *Fatigue & Fracture of Engineering Materials & Structures*, 32 pp. 18-25 (2009). Because of the minimum size constraints involved with heat-strengthening or tempering, their sample dimensions (10×100×1000 mm with effective test length of about 500 mm) were significantly larger than in our study and a direct comparison requires appropriate scaling since, statistically speaking, a larger area would have a higher probability of including a critically-sized flaw at a given stress. We used a treatment based on the work of Vuolio (2003) and Beason and Lignell (2002) Beason, W L and A W Lignell, "*A Thermal Stress Evaluation Procedure for Monolithic Annealed Glass*", Symp. on the Use of Glass in Buildings, ASTM STP1434, ed. V L Block (2002), in which the strengths for different sample sizes are proportional to the ratio of the respective edge areas:

$$\sigma_1/\sigma_2 = (Area_2/Area_1)$$

The Weibull modulus, m, is a measure of the variation in the respective strength distribution. A value of m=5.8, determined from the experimental data, was used for the calculations. This corresponded to a ratio of 1.7.

Figure 6:
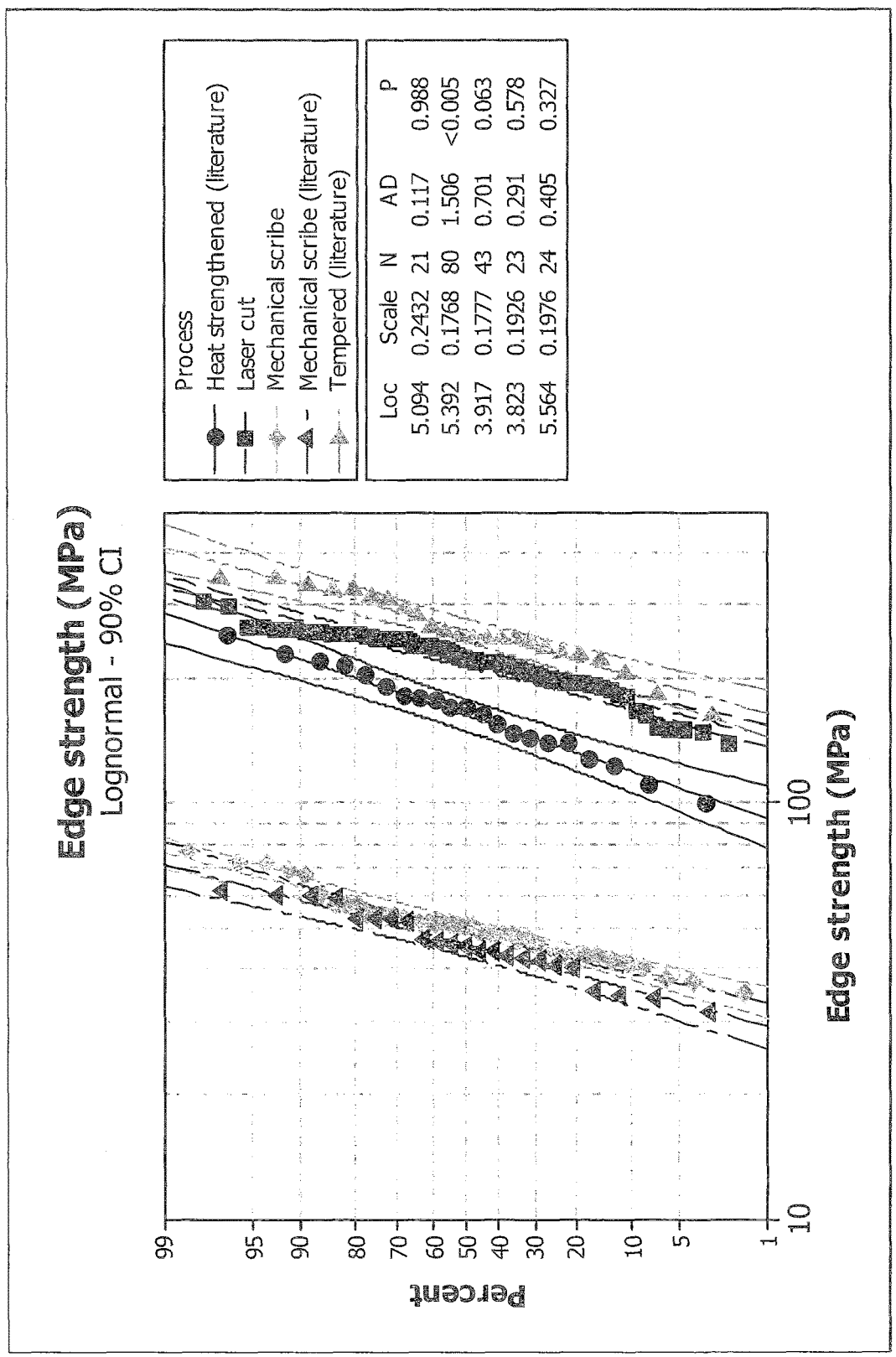
FIG. 6. provides a probability plot of strength for glass samples comparing mechanical cut and laser cut panels.

The area-adjusted data comparing in-house and literature test results are shown in FIG. 6. Comparison of in-house and literature data suggest that the laser-cut test data lie in-between the distributions for heat-strengthened ("HS") and fully tempered ("FT") literature data.

FIG. 6 further shows a comparative probability plot of edge strength for mechanical and laser scribing. It is believed that the laser scribed panels show a strength of at least 60 MPa. In some embodiments, the strength of the laser scribed panels is at least 69 MPa, preferably about 75 MPa, more preferably about 100 MPa.

FIG. 6 also provides a comparison of experimental testing (mechanical ("Mechanical Scribe") and ("Laser cut") and literature data (adjusted for differences in test sample geometry). Our test data for annealed samples made using conventional mechanical scribe and laser cut processes are shown as triangles and squares, respectively in FIG. 6. In general, the strength distribution of laser-cut glass (representing the total data from five different laser cutting campaigns using different laser cutting machines) can be described as having a performance between HS and FT performance.

Example 9—Laser-Cut Laminate

| Component | Material | Properties |
|---|---|---|
| EC outer laminate glass pane | Fully-tempered soda-lime float glass | Thickness: 3.2 mm CTE: 8.5 ppm/K |
| EC substrate | Annealed soda-lime float glass | Thickness: 1.7 mm CTE: 8.5 ppm/K |
| Interlayer material | PVB | Thickness: 0.76 mm |

Method of Manufacture:

The laser-cut laminate of Example 9 was manufactured according to a "coat-then-cut" process. The lamination was performed using a conventional nip roller/autoclave process. The EC substrate (EC device or device precursor) was laser-cut, as described herein, after the EC stack was deposited. The laser-cut laminate edge strength was measured by inducing edge stresses by creation of a temperature gradient in the sample. The temperature gradient was created using a silicone heating pad that was smaller in lateral dimensions compared to the laminate. The pad was placed on the surface of the laminate with an unheated perimeter about 25 mm wide. The magnitude of the gradient was controlled by adjusting the applied power to the heating pad (controlled by a variac variable power supply) while keeping the laminate edges near room temperature. The edge stresses created by the induced temperature gradient were directly measured using photoelastic techniques (Stress Photonics, Inc., Madison, WI).

Results:

The laser-cut, laminated EC structures having the components detailed above had an edge strength of at least about 60 MPa after lamination.

A process capability study of as-fabricated thermal laser scribe (TLS) processing was also performed. The study used the mechanical, four-point bend test described above. Data from over 80 samples from five testing sessions were collected. The data, representing five different TLS campaigns over a six-month period, were used to develop a process capability based on different maximum in-service edge stresses. The process capability Cpk suggested that the as-fabricated strength was sufficient to provide a low probability of failure in the operational stress environment for EC device laminate window applications.

In order to calculate process capability using conventional statistical methods, it was required that the data have a normal distribution. The TLS mechanical test data followed a lognormal distribution and required a logarithmic transformation to achieve normality. Process capability values and corresponding predicted failure rates were calculated for a number of lower specification limits (i.e. maximum edge stresses) to determine the sensitivity to device thermal gradients. The maximum edge stress depends on the environmental interaction as well as window or architectural frame design (e.g. fully insulated frames versus heat sink designs). Capability analyses were calculated using Minitab15 statistical software package.

| Calculated breakage probability v maximum edge stress | |
|---|---|
| Maximum stress (MPa) | Probability of breakage |
| 117 | 0.171 |
| 103 | 0.0910000 |
| 90 | 0.0380000 |
| 83 | 0.0220000 |
| 69 | 0.0048000 |
| 55 | 0.0005300 |
| 41 | 0.0000160 |
| 34 | 0.0000010 |
| 28 | 0.0000001 |

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A laminate electrochromic device, comprising:
   a glass pane;
   a substrate, wherein the substrate is annealed glass;
   an electrochromic device, wherein the electrochromic device is on the substrate, wherein the substrate is laminated on the glass pane, wherein the substrate comprises a coefficient of thermal expansion that is different from a coefficient of thermal expansion of the corresponding glass pane, and wherein the electrochromic device has an edge strength of at least 60 MPa.

2. The laminate of claim 1, wherein each of said individual electrochromic device has an edge strength of at least 69 MPa.

3. The laminate of claim 1, wherein the electrochromic device has an edge strength of at least 75 MPa.

4. The laminate of claim 1, wherein the electrochromic device has an edge strength of at least 100 MPa.

5. The laminate of claim 1, further comprising an interlayer disposed between the electrochromic substrate and its corresponding glass pane.

6. The laminate of claim 5, wherein the interlayer comprises a polyvinylbutyral, an ionomeric material, an ethylenevinyl acetate, a polyurethane, or a mixture thereof.

7. The laminate of claim 1, wherein the electrochromic device is smaller than its corresponding glass pane in at least one dimension.

8. The laminate of claim 7, wherein the electrochromic device is indented about 0.5 mm to about 3 mm relative to the its corresponding glass pane in at least one dimension.

9. The laminate of claim 7, wherein the electrochromic devices is indented about 1 mm to about 2 mm relative to said outer laminate glass pane in at least one dimension.

10. The laminate of claim 1, wherein the electrochromic device is about the same size as said outer laminate glass pane.

11. The laminate of claim 1, wherein the electrochromic glass substrate is a different material than the outer laminate glass pane.

12. The laminate of claim 1, wherein a material for the electrochromic glass substrate is selected from the group consisting of low coefficient of thermal expansion glass, soda-lime float glass, aluminosilicate glass, borofloat glass, boroaluminosilicate glass, low sodium-containing glass, or a polymer.

13. A laminate electrochromic device, comprising:
a glass pane;
a substrate, wherein the substrate is annealed glass;
an electrochromic device, wherein the electrochromic device is on the substrate, wherein the substrate is laminated on the glass pane, wherein the substrate comprises a coefficient of thermal expansion that is different from a coefficient of thermal expansion of the corresponding glass pane, wherein the electrochromic device has an edge strength of at least 60 MPa, and wherein the electrochromic glass substrate has a coefficient of thermal expansion ranging from about 2 ppm/K to about 10 ppm/K.

14. The laminate of claim 13, wherein the electrochromic glass substrate has a thickness ranging from about 0.7 mm to about 6 mm.

15. The laminate of claim 13, wherein the electrochromic glass substrate has a thickness ranging from about 10 μm to about 300 μm.

16. The laminate of claim 13, wherein the electrochromic glass substrate has a thickness ranging from about 40 μm to about 120 μm.

17. The laminate of claim 13, wherein the outer laminate glass pane has a thickness ranging from about 2.3 mm to about 12 mm.

18. A laminate electrochromic device, comprising:
a glass pane;
a substrate, wherein the substrate is annealed glass;
an electrochromic device, wherein the electrochromic device is on the substrate, wherein the substrate is laminated on the glass pane, wherein the substrate comprises a coefficient of thermal expansion that is different from a coefficient of thermal expansion of the corresponding glass pane, and wherein the electrochromic device has an edge strength of at least 60 MPa and wherein the laminate has an edge strength of at least 17 MPa.

19. The laminate of claim 18, wherein the laminate has an edge strength of at least 21 MPa.

* * * * *